United States Patent [19]
Takahashi et al.

[11] Patent Number: 6,049,525
[45] Date of Patent: Apr. 11, 2000

[54] TERMINAL MULTIPLEXER AND METHOD OF CONSTRUCTING THE TERMINAL MULTIPLEXER

[75] Inventors: Masatoshi Takahashi, Yokohama; Atsushi Kubotera, Fujisawa; Takashi Mori, Yokohama; Kazutaka Sakai, Yamato, all of Japan; Toshiki Sugawara, Dallas, Tex.

[73] Assignee: Hitachi, Ltd., Tokyo, Japan

[21] Appl. No.: 08/884,137

[22] Filed: Jun. 27, 1997

[30] Foreign Application Priority Data

Jun. 28, 1996 [JP] Japan ..................................... 8-170309

[51] Int. Cl.[7] .................................. H04J 3/08; H04L 1/22
[52] U.S. Cl. ............................ 370/223; 370/228; 370/535
[58] Field of Search ..................................... 370/222, 223, 370/224, 219, 907, 535, 538, 539, 228

[56] References Cited

U.S. PATENT DOCUMENTS 5,216,666  6/1993  Stalick .................................... 370/16.1
5,546,403  8/1996  Yamamoto et al. .................... 370/20.5
5,757,806  5/1998  Koyama et al. ......................... 370/355

Primary Examiner—Melvin Marcelo
Attorney, Agent, or Firm—Antonelli, Terry, Stout & Kraus, LLP

[57] ABSTRACT

A terminal multiplexer is constructed in such a manner that it can be upgraded for adapting to a change in a transmission system. Line terminating equipment (LTE) having working high speed transmission lines and protection high speed transmission lines in 1:1, is constructed from such units as two sets of 10 G interfaces responsible for interface with the high speed transmission lines, and SELH which selects a high speed transmission line for which multiplex conversion is performed in relation to low speed transmission lines. When this LTE is to be upgraded to ADM adapted for 2-Fiber BLSR, the unit SELH is replaced with SWH which performs switching of signals in each time slot between a high speed transmission line and the low speed transmission lines. Upgrading during the system operation is possible by making signal interfaces with the outside common for SELH and SWH, and by making delay times between signal input and output coincide for various signals.

20 Claims, 16 Drawing Sheets

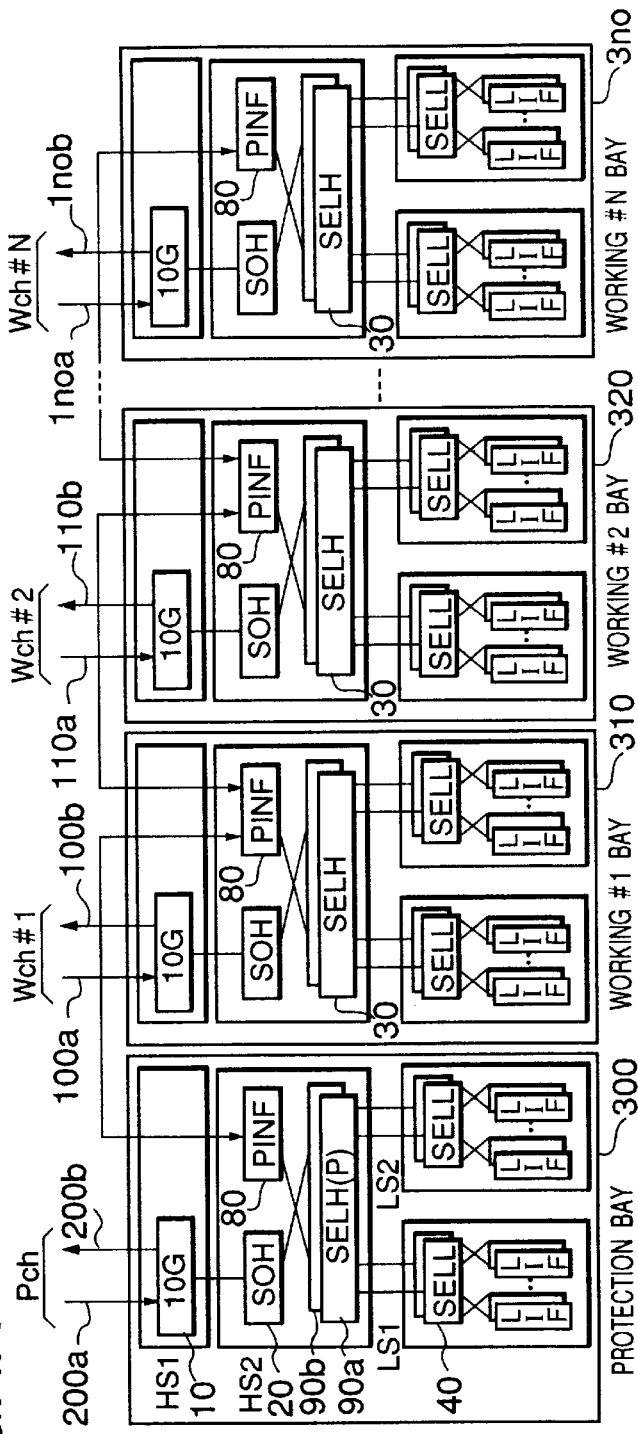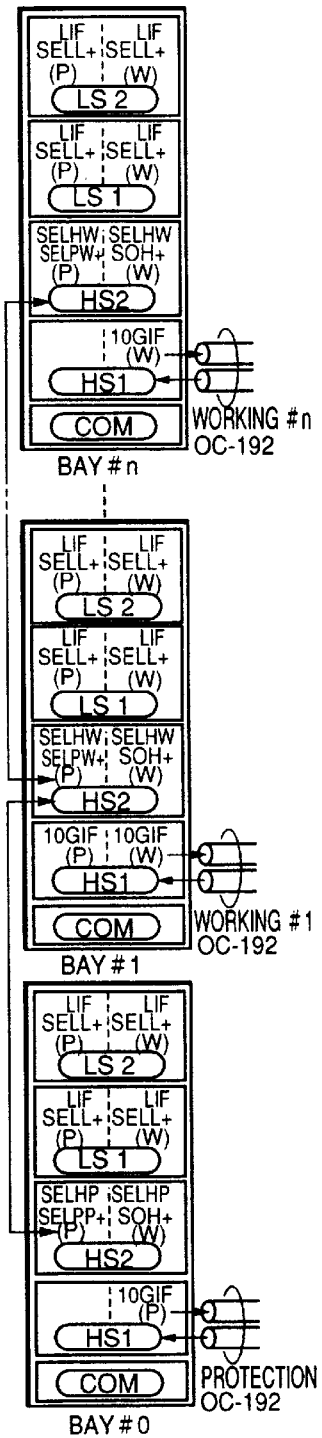
FIG.4A
FIG.4B

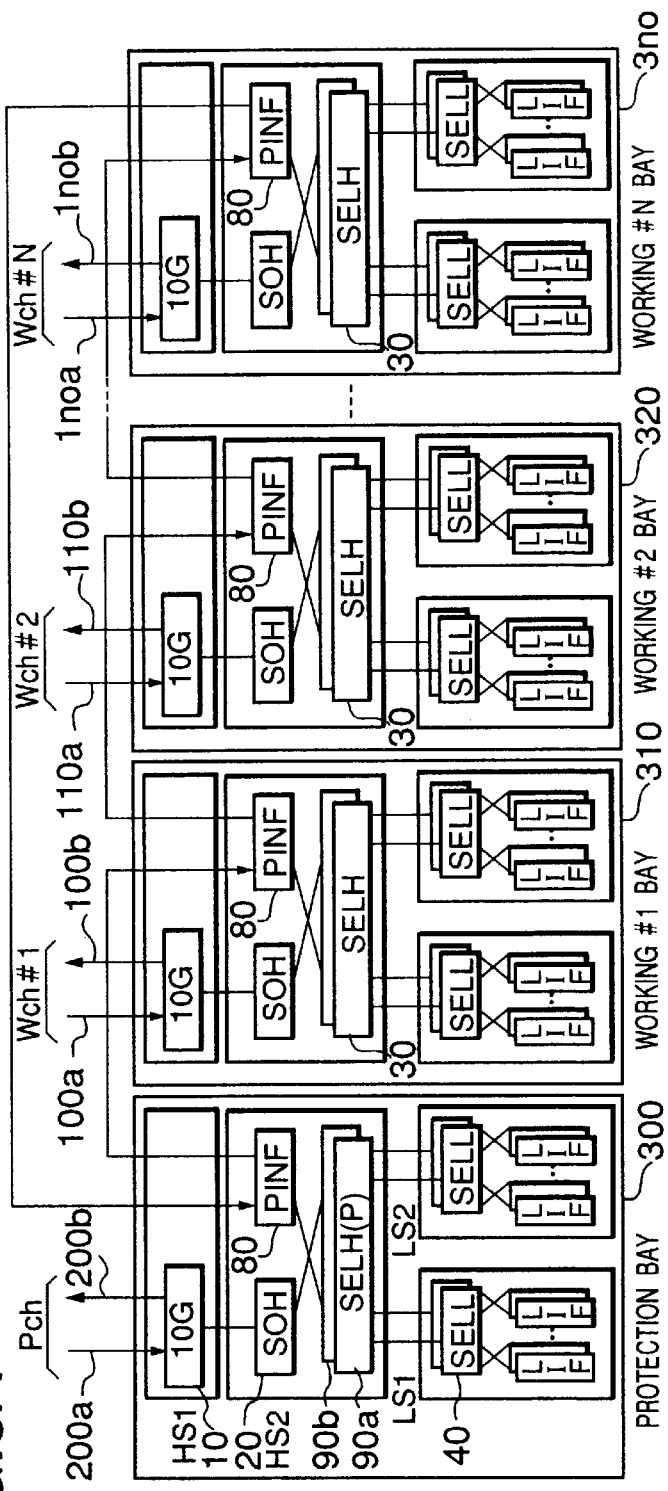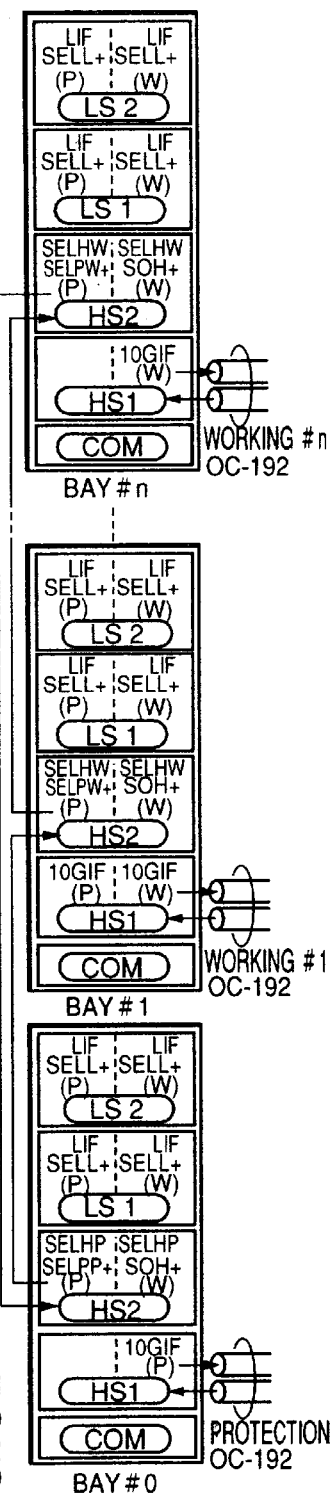
FIG.5A
FIG.5B

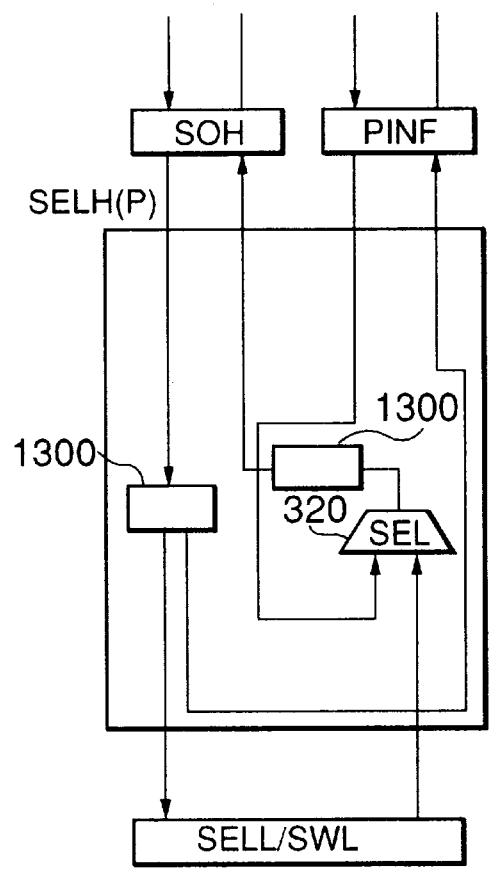
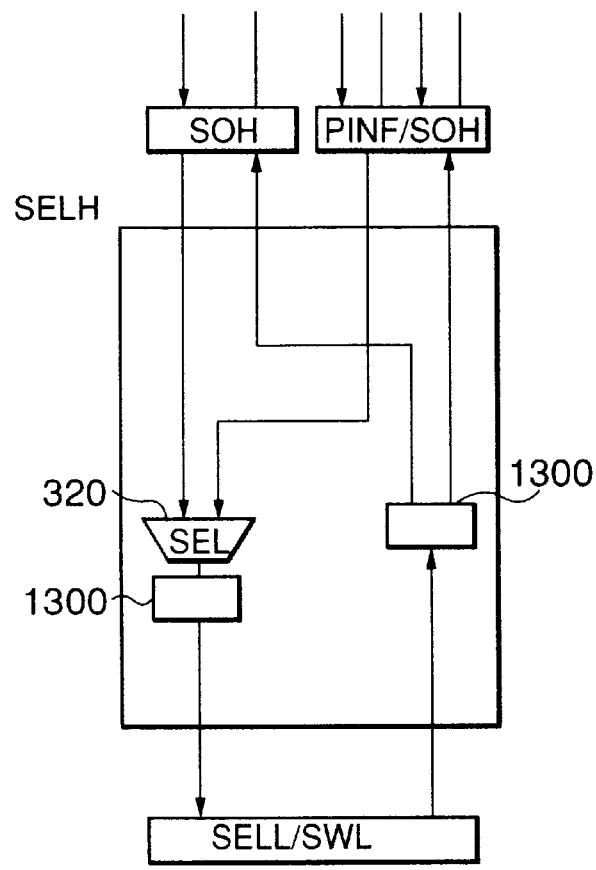

FIG.13A
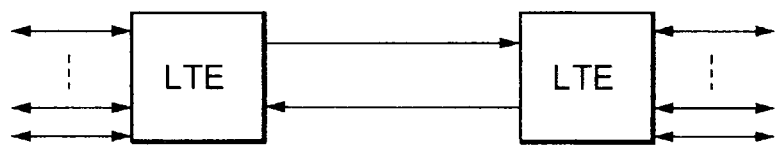
FIG.13B
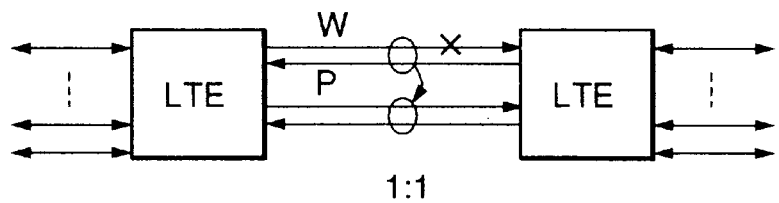
1:1
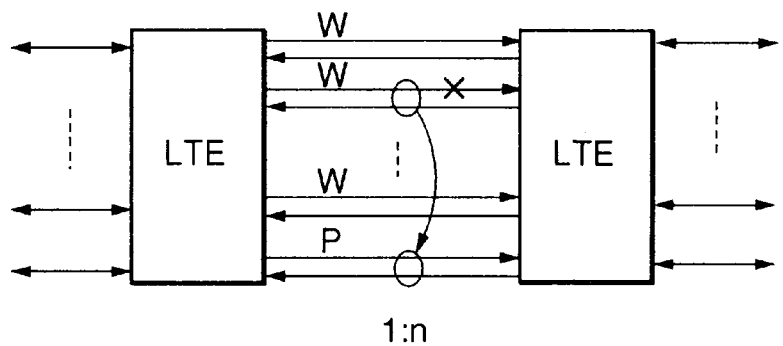
1:n
FIG.13C
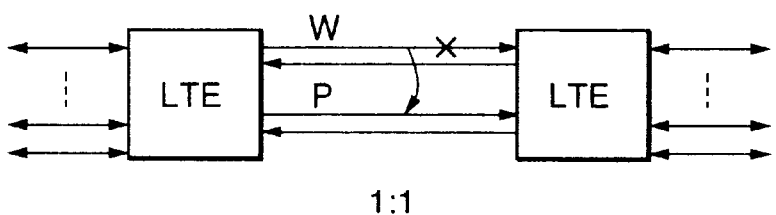
1:1
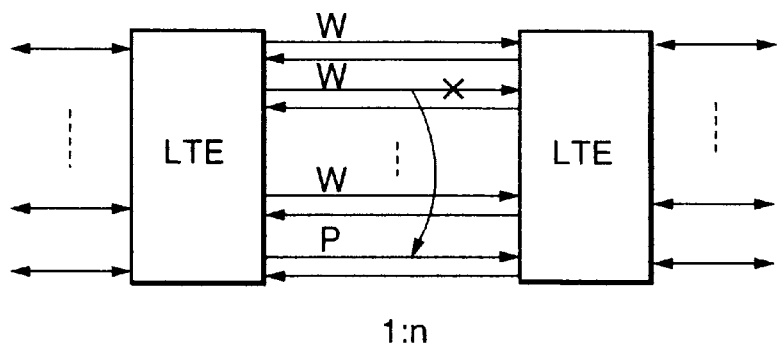
1:n

1:1

1:n

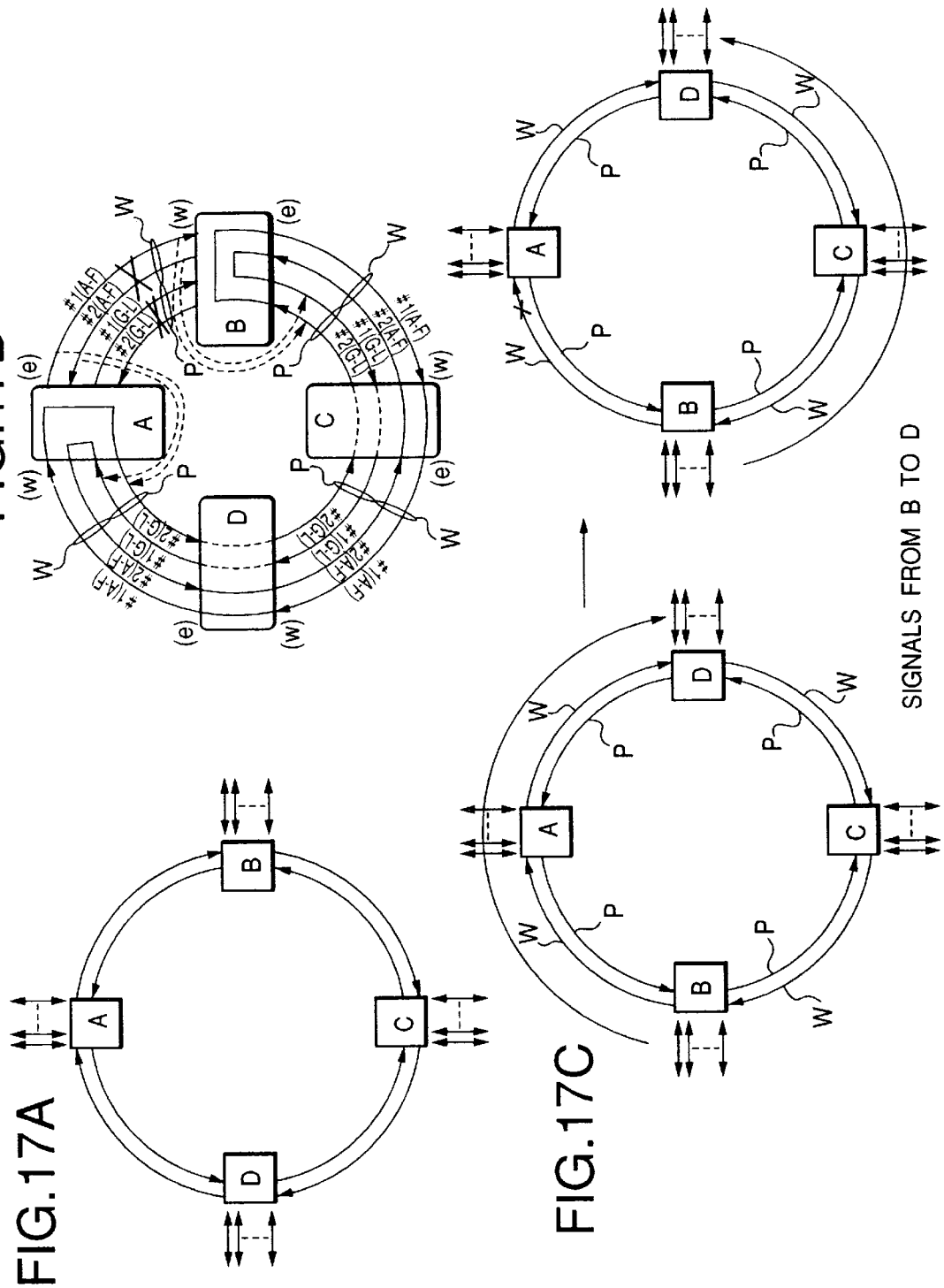

TERMINAL MULTIPLEXER AND METHOD OF CONSTRUCTING THE TERMINAL MULTIPLEXER

BACKGROUND OF THE INVENTION

1. Field of the Invention

The present invention relates to a terminal multiplexer which performs multiplexing and demultiplexing of digital signals between a plurality of low speed transmission lines and a high speed transmission line in a digital communication network and relates to a terminal multiplexer such as a channel rearrange equipment, for example ADM (Add Drop Multiplexer), having a cross connect function.

2. Description of Related Art

As a transmission system using a terminal multiplexer which performs multiplex conversion of signals between a plurality of low speed transmission lines and a high speed transmission line, there is known a system in which line terminating equipments (hereinafter, referred to as "LTE") are connected in a point-to-point manner, perform time division multiplexing of low speed signals received from a plurality of low speed transmission lines to send them as high speed signals onto a high speed transmission line, and perform demultiplexing of high speed signals received from the high speed transmission line into a plurality of low speed signals to send the demultiplexer signals onto respective low speed transmission lines, as shown in FIG. 13A.

As a configuration for realizing automatic protection switching in a transmission system using such LTEs, there are known 1:1 configuration and 1:n configuration. In the 1:1 configuration, a set of two working high speed transmission lines which transmit signals in opposite directions to each other and a set of two protection (i.e., preparatory) high speed transmission lines which transmit signals in opposite directions to each other are provided between the LTEs at both ends. In the 1:n configuration, between the LTEs at both ends, there are provided a plurality of working high speed transmission lines in sets of pairs, which transmit signals in the opposite directions to each other, and a set of two protection high speed transmission lines which an used in common with the plurality of high speed transmission lines and transmit signals in opposite directions to each other.

In the present description, working lines will be represented by the symbol "W" (working), and protection lines will be represented by the symbol "P" (Protection). Further, as for terminal multiplexer connected between two other terminal multiplexers, one side of the two other terminal multiplexers will be described as "West" and the other side will be described as "East".

Now, in LTEs in 1:1 and 1:n configurations, when a problem arises in a working high speed transmission line, automatic protection switching is performed so that the high speed transmission line used for transmitting signals is switched from the faulty one to a protection high speed transmission line. As a method for carrying out this switching, the bi-directional switching method and the uni-directional switching method are known. In the bi-directional switching method, as shown in FIG. 13B, both of the two high speed transmission lines in the faulty set are switched to two protection high speed transmission lines. In the uni-directional switching method, as shown in FIG. 13C, only the faulty high speed transmission line is switched to a line having the same direction of transmitting signals as the faulty line out of the protection high speed transmission lines.

Further, as a terminal multiplexer which performs multiple conversion between a plurality of low speed transmission lines and a high speed transmission line, as shown in FIG. 14A, there is known an ADM which performs demultiplexing of some high speed signals received from the high speed transmission line (West side) into a plurality of low speed signals to send them onto the respective low speed transmission lines, and performs time division multiplexing of the remaining high speed signals received from the high speed transmission line and low speed signals received from the low speed transmission lines to send the multiplexed signals onto the other high speed transmission line (East side), or performs similar operations in the reverse direction from the East side to the West side.

As a configuration of a transmission system using such an ADM, there are known a linear configuration in which ADMs are located between LTEs as shown in FIG. 14B, and a ring configuration in which a plurality of ADMs are connected in a ring shape with high speed transmission lines as shown in FIG. 14C.

As the linear configuration using ADMs, there are known two configurations corresponding respectively to the above-described 1:1 and 1:n configurations of LTFs. In the 1:1 linear configuration, as shown in FIG. 15A, on each of the West and East sides, there are provided a set of two working high speed transmission lines for transmitting signals in opposite directions to each other and a set of two protection high speed transmission lines for transmitting signals in opposite directions to each other. In the 1:n linear configuration, as shown in FIG. 15B, on each of the West and East sides, there are provided a plurality of working high speed transmission lines in sets of two, transmitting signals in opposite directions to each other, and a set of two protection high speed transmission lines which are used in common with the plurality of high speed transmission lines and transmit signals in opposite directions to each other. Here, at the time of the automatic protection switching of ADM in 1:1 and 1:n linear configurations, switching from the working high speed transmission lines to the protection high speed transmission lines is performed on each of the West and East sides, similarly to the above-described switching in LTE in 1:1 and 1:n configurations.

On the other hand, as the ring configuration in which ADMs are connected in a ring shape, there have been proposed a 2 fiber configuration in which each pair of adjacent ADMs are connected with a set of two optical fiber transmission lines transmitting signals in opposite directions to each other, and a 4 fiber configuration in which each pair of adjacent ADMs are connected with two sets of two optical fiber transmission lines transmitting signals in opposite directions to each other.

Further, as the 4 fiber ring configuration, there is known 4-Fiber BLSR (Bi-directional Line Switched Ring) in which, as shown in FIG. 16A, out of two sets of optical fiber transmission lines connecting each pair of ADMs, one set is used as working lines and the other set is used as protection lines. As the 2 fiber ring configuration as shown in FIG. 17A, there are known 2-Fiber UPSR (Uni-directional Path Switched Ring) and 2-Fiber BLSR. In 2-Fiber UPSR, optical fiber transmission lines transmitting signals in one rotational direction are used as working lines and optical fiber transmission lines transmitting signals in the other rotational direction are used as protection lines, and switching is performed for each path. In 2-Fiber BLSR, instead of setting a working or protection line for each optical fiber transmission line, some time slots on each optical fiber transmission line are used as working slots and the other time slots are used as protection slots.

Now, switching from working lines to protection lines at the time of automatic protection switching in 4-Fiber BLSR is illustrated in FIGS. 16B and 16C. As shown, as the switching performed by ADMs adjacent to a faulty portion in 4-Fiber BLSR, there are two kinds of switching, i.e., (1) switching from a set of working optical fiber transmission lines on the side of the faulty portion to a set of protection optical fiber transmission lines on the side of the faulty portion (FIG. 16B), and (2) turning back of signal flows from a set of working optical transmission lines on the opposite side to the faulty portion to a set of protection optical fiber transmission lines on the opposite side to the faulty portion (FIG. 16C), the former being called Span Switch, and the later Ring Switch.

FIG. 17B illustrates the switching from the working time slots to the protection time slots at the time of automatic protection switching in 2-Fiber BLSR, and FIG. 17C illustrates the switcing from the working path to the protection path at the time of automatic protection switching in 2-Fiber UPSR.

As shown, switching in 2-Fiber BLSR is performed in such a manner that ADMs adjacent to a faulty portion turn back signal flow in working time slots of two optical fiber transmission lines on the opposite side to the faulty portion into protection time slots of two optical fiber transmission on the opposite side to the faulty portion. In FIG. 17B, in the case that time slots A–F of #1 optical fiber transmission lines and time slots A–F of #2 optical fiber transmission lines are used as working time slots, and time slots G–L of #1 optical fiber transmission lines and time slots G–L of #2 optical fiber transmission lines are used as protection time slots, ADM A, B adjacent to the faulty portion turn back signal flow in the time slots A–F of #1 optical fiber transmission lines into the time slots G–F of #2 optical fiber transmission lines, and turn back signal flow in the time slots A–F of #2 optical fiber transmission lines into the time slots G–F of #1 optical fiber transmission lines.

Further, switching of 2-Fiber UPSR is performed as shown in FIG. 17C. Namely, each ADM transmits signals to other ADMs, using both the working optical fiber transmission lines and protection optical fiber transmission lines. In a normal condition, each ADM receives signals from other ADMs through working optical fiber transmission line and processes them, and when it can not receive from a particular ADM through the working optical fiber transmission line, it receives signals from that particular ADM through protection optical fiber transmission line and processes them.

As described above, functions required for a terminal multiplexer vary according to LTE used in the 1:1 configuration, LTE used in the 1:n configuration, ADM used in the 1:1 linear configuration, ADM used in the 1:n linear configuration, ADM used in 4-Fiber BLSR, ADM used in 2-Fiber BLSR, and ADM used in 2-Fiber UPSR. Accordingly, LTEs or ADMs have, conventionally, been made as dedicated equipments for each particular configuration of transmission system.

Sometimes, it is desired to change a configuration of a transmission system, for example, in order to make the transmission system advance after the start of its operation. For example, it may be desired that, in order to increase transmission capacity, a transmission system using LTEs connected in 1:1 configuration in a point-to-point manner is changed to a transmission system using LTEs connected in 1:n configuration in a point-to-point manner, or that a transmission system using LTEs connected in 1:1 configuration in a point-to-point manner is changed to 2-Fiber BLSR or 4-Fiber BLSR, in accordance with increase in connected points.

Conventionally, however, each LTE or ADM is a dedicated equipment for a transmission system before change, and therefore, when configuration of such a transmission system is to be changed, LTEs or ADMs should be exchanged, so that the burden of introducing equipments is large at the time of changing the configuration of a transmission system. Further, when LTEs or ADMs are exchanged, a transmission system must be taken down once, and communication must be stopped.

On the other hand, in accordance with recent increase in transmission capacity of a transmission system, a multiplex conversion equipment becomes of large scale. Accordingly, for example, it is, now, difficult to construct a terminal multiplexer adapted for OC-192 (optical carrier 192) using an optical fiber transmission line with 10 G of transmission capacity as a high speed transmission line, in one rack. Here, a "rack" is a case which houses electronic boards constituting a terminal multiplexer, and is provided with printed circuits connecting between electronic boards. A rack is limited in its size from the viewpoint of handling requirements such as transportation and installation. Thus, when a terminal multiplexer can not be constructed with single rack but with a plurality of racks, signals should be sent and received among the racks. To send and receive signals among the racks, cables should be used instead of printed circuit on an electronic board. Accordingly, and for other reasons, there are some limitations in terms of number and speed of signals, differently from sending and receipt of signals within a rack. Thus, for example, it is difficult to employ such a configuration that, in LTE etc. of 1:n configuration, n working high speed transmission lines and one protection high speed transmission line are connected to inputs of a single selector, and that selector switches the above-described working and protection lines.

SUMMARY OF THE INVENTION

A first object of the present invention is to provide a method of constructing a terminal multiplexer, by which a configuration of a transmission system can be changed by upgrading terminal multiplexers such as LTEs or ADMs used in a conventional transmission system.

A second object of the present invention is to provide a terminal multiplexer having a configuration suited for using a plurality of racks to construct a terminal multiplexer.

To accomplish the above-described first object, the present invention provides a method of constructing a terminal multiplexer, comprises steps of: providing a high speed transmission line interface unit responsible for signal input-output interface with a set of sending and receiving high speed transmission lines; a low speed transmission line interface unit responsible for signal input-output interface with a set of sending and receiving low speed transmission lines; a multiplex converting unit for performing multiplexing and demultiplexing between high speed signals transmitted on the high speed transmission lines and low speed signals transmitted on the low speed transmission lines; and a switching unit for performing switching between the high speed signals transmitted on the high speed transmission lines and the low speed signals transmitted on the low speed transmission lines, which has an interface for signals outside of the unit, which is made common with an interface for signals outside of the multiplex converting unit;

combining the high speed transmission line interface unit, and the multiplex converting unit, the low speed transmission line interface unit to construct a terminal multiplexer; and constructing a channel rearrange equipment by substituting the switching unit for the multiplex converting unit of the terminal multiplexer.

According to such a construction method, a terminal multiplexer such as LTE can be upgraded to a channel rearrange equipment such as ADM, simply by substituting a switching unit for a terminal multiplexer. Thus, by such upgrading, the configuration of a transmission system can be changed.

Further, to accomplish the above-described second object, the present invention provides a terminal multiplexer for transmitting signals to an apparatus at each side to be connected to the terminal multiplexer, using, for example, n (n is an integer greater than or equal to 1) sets of working high speed transmission lines and one set of sending and receiving protection high speed transmission lines, comprising:

n working equipments, i,e. 1st to n-th working equipments and one protection equipment; wherein each of the working equipments comprises: a high speed transmission line interface unit responsible for signal input-output interface with a set of working high speed transmission lines;

a plurality of low speed transmission line interface units responsible for signal input-output interface with a set of sending and receiving low speed transmission lines;

a multiplex converting unit which performs demultiplexing of high speed signals received by the high speed transmission line interface unit from the working high speed transmission lines, to distribute the demultiplexed signals to respective the low speed transmission line interface units as signals to be sent to the low speed transmission lines, and performs multiplexing of low speed signals received by the respective low speed transmission line interface units from low speed transmission lines, to send the multiplexed signals to the high speed transmission line interface unit as high speed signals to be sent to the working high speed transmission lines; and a first forwarding unit connected to the multiplex converting unit;

the protection equipment comprising at least:
a high speed transmission line interface unit responsible for signal input-output interface with a set of protection high speed transmission lines; and
a second forwarding unit connected to the high speed transmission line interface unit;

the second forwarding unit of the protection equipment being connected to the first forwarding unit of the first working equipment;

the first forwarding unit of the m-th (m is an integer varying from 1 to (n−1)) working equipment being connected to the first forwarding unit of the (m+1)-th working equipment; and the first forwarding units of the working equipments and the second forwarding unit of the protection equipment forming a transmission system which forwards high speed signals received by the high speed transmission line interface unit of the protection high speed transmission lines from the protection high speed transmission lines, to a multiplex converting unit of any working equipment successively, as high speed signals to be objects of demultiplexing in the multiplex converting unit in question instead of high speed signals received by the high speed transmission line interface unit, and forwarding (sending) high speed signals multiplexed by the multiplex converting unit of any working equipment to the high speed transmission line interface unit of the protection equipment as high speed signals to be sent from the protection high speed transmission lines.

According to a terminal multiplexer constructed as such a terminal multiplexer, by forwarding high speed signals which should be sent to or received from protection high speed transmission lines, successively between forwarding units of the working equipments and protection equipment, it is possible to extend the protection high speed transmission lines as substitutes of a faulty working high speed transmission line up to a multiplex converting unit of a working equipment connected to the faulty working high speed transmission line. Thus, capacity corresponding to the transmission capacity of the protection high speed transmission line is sufficient as the capacity of signal line needed for connection between the working equipments and the protection equipment.

BRIEF DESCRIPTION OF THE DRAWINGS

FIG. 4A is a block diagram showing construction of an LTE in 1:n configuration;

FIG. 4B is a view showing a state in which units of the LTE of FIG. 4A are mounted in racks;

FIG. 5A is a block diagram showing another construction of an LTE in 1:n configuration;

FIG. 5B is a view showing a state in which units of the LTE of FIG. 6A are mounted in racks;

FIG. 9A is a block diagram showing construction of an SELH unit;

FIG. 9B is a block diagram showing construction of an SELH(P) unit;

FIG. 13A is a view showing basic construction of a transmission system using an LTE;

FIG. 13B is a view illustrating switch from working lines to protection lines;

FIG. 13C is a view illustrating another example of switching from working lines to protection lines;

FIG. 17A is a view showing basic construction of a transmission system of 2-Fiber UPSR or 2-Fiber BLSR;

FIG. 17B is a view illustrating switching from working slots to protection slots on high speed transmission lines in 2-Fiber UPSR or 2-Fiber BLSR; and FIG. 17C is a view illustrating another example of switching from working high speed transmission lines to protection high speed transmission lines in 2-Fiber UPSR or 2-Fiber BLSR.

DETAILED DESCRIPTION OF THE PREFERRED EMBODIMENT

Now, an embodiment of the present invention will be described.

In the present embodiment, there are provided 8 kinds of unit: a 10 G interface which sends and receives signals to or from an optical fiber transmission line for optical/electrical and electrical/optical conversion, for example; SOH for overhead processing of signals; SELH, a selector on the side of the high speed signals; SELH(P), a selector on the side of the high speed signals; SWH, a switch on the side of the high speed signals; SWL, a switch on the side of the low speed signals; PINF for sending and receiving signals between racks; and SELL, a selector on the side of the low speed signals for selection of signals between low speed transmission lines, and one or more kinds of units LINF responsible for interface with low speed transmission lines. By combining these units, terminal multiplexers such as LTE or ADM adapted for various configurations of transmission system are constructed. Each unit comprises one or more electronic boards mounted in a rack.

Further, 10 G interface and SOH together make a high speed interface undertaking interface with the optical fiber transmission line. Accordingly, 10 G interface and SOH may be treated as one high speed interface unit.

Figure 1:
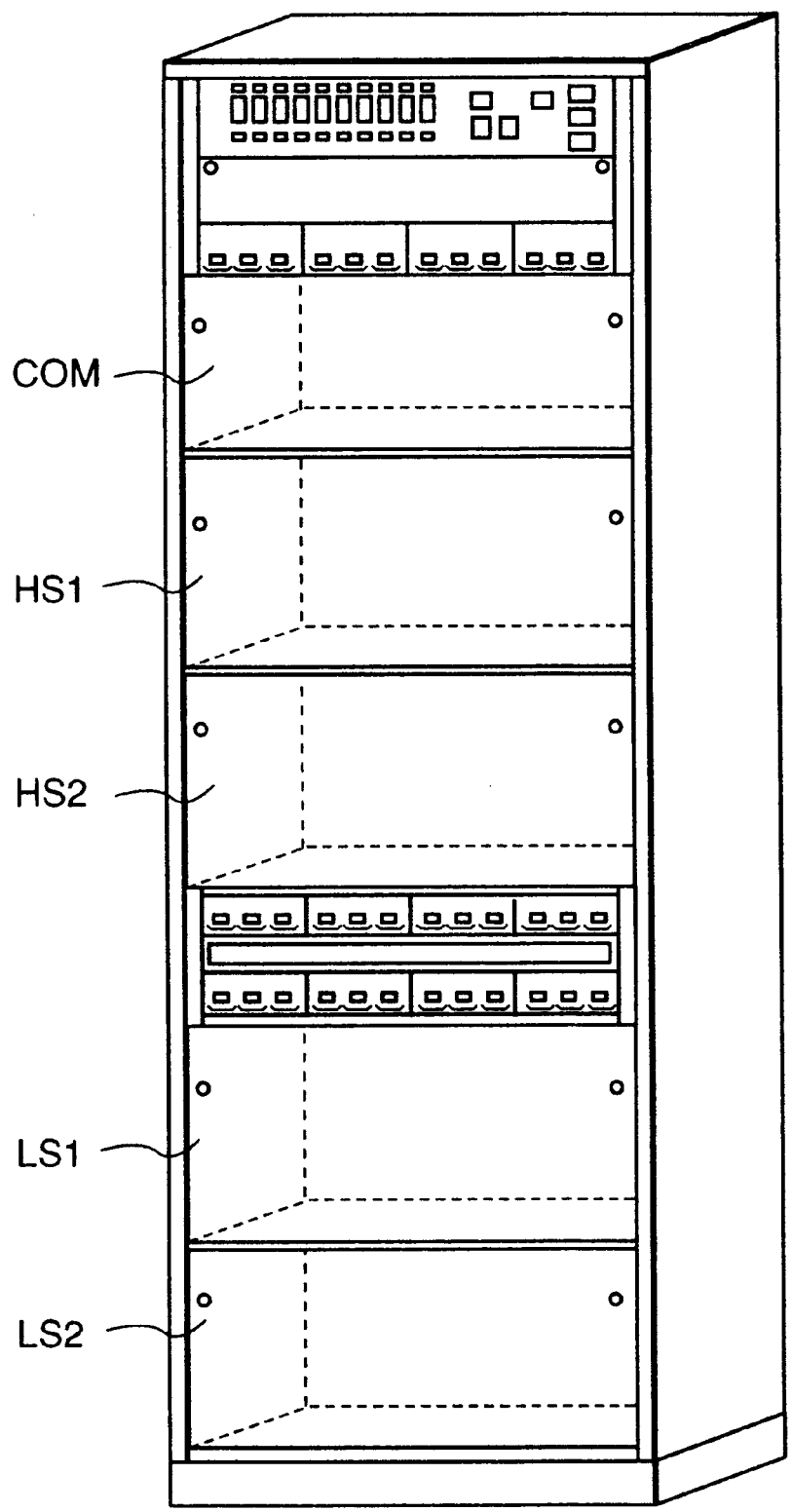
FIG. 1 is a view showing construction of a rack used for a terminal multiplexer.

Further, as shown in FIG. 1, in the present embodiment, the terminal multiplexer is constructed by using a rack having 5 slots. When electric boards are mounted into the rack, they are connected by wiring provided in the rack. In the following description of the present embodiment, respective slots are referred to as COM, HS1, HS2, LS1 and LS2.

Into the slot COM, there is mounted an electronic board bearing various control systems which perform clock generation, power control, system switching control, maintenance control, and the like.

Figure 2A:
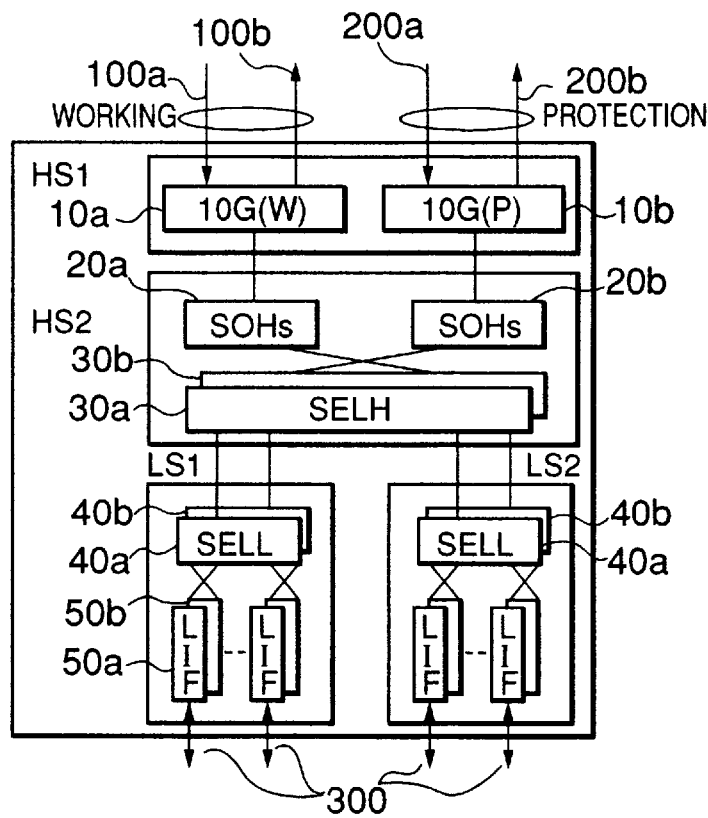
FIG. 2A is a block diagram showing construction of LTE in 1:1 configuration.
Figure 2B:
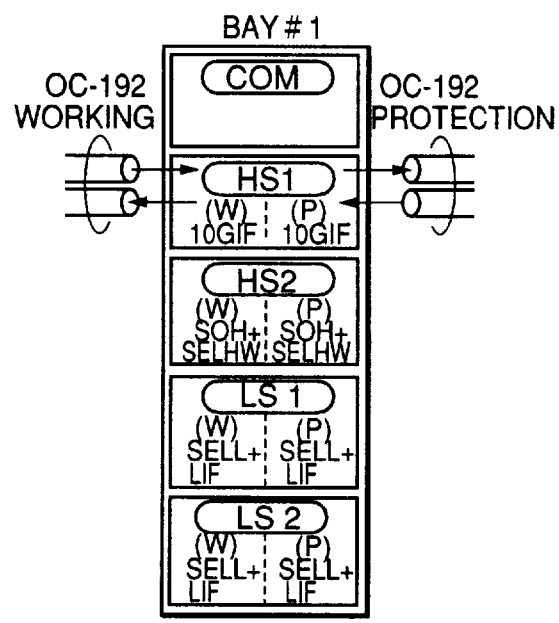
FIG. 2B is a view showing a state in which units of the LTE of FIG. 2A are mounted in a rack.

First, FIGS. 2A and 2B show LTEs connected in point-to-point manner in a 1:1 configuration.

As shown in FIG. 2A, in this case, the LTE comprises two 10 G interface units 10a, 10b, two SOH units 20a, 20b, two duplicated SELH units 30a, 30b, plural sets of duplicated SELL units 40a, 40b, and plural sets of duplicated LIF units 50a, 50b. Further, FIG. 2B shows slots of a rack into which respective units are mounted.

In an LTE having such construction, at the time of normal operation, optical signals are received by working (W) 10 G interface 10a from working optical fiber transmission line 100a which transmits signals at a transmission speed of 10 G, and, after being converted into electrical signals, they are sent to working SOH 20a, subjected to given overhead processing, and sent to working SELH 30a. These Signals are sent through working SELH 30a to working SELL 40a, and demultiplexed there. Then, signals in respective time slots are sent to respective working LIF 50a in accordance with the destinations of the signals. Each LIF 50a converts the received signals to low speed signals and sends them to low speed transmission line 300.

Conversely, signals received by respective working LIFs 50a from low speed transmission lines 300 are subject to time division multiplexing at working SELL 40a, sent to working SELH 30a and then to both the working SOH 20a and the protection SOH 20b, and there subjected to the overhead processing. Then, the signals are sent to the working 10 G interface unit 10a and the protection 10 G interface unit 10b, converted to optical signals, and sent respectively to working optical fiber transmission line 100b and protection optical fiber transmission line 200b on the sending side. Namely, the working and protection optical fiber transmission lines 100b, 200b on the sending side are sent the same signals which are converted from the signals received from the low speed transmission lines by time division multiplexing. Thus, in act, even at the time of normal operation, each LTE receives the same signals from the working optical fiber transmission line 100a and the protection optical fiber transmission line 200a. Further, the signals are subject to the overhead processing at protection SOH 20b, and inputted into working and protection SELHs.

Now, in such a construction, when a problem arises in some working optical fiber transmission line, the LTE receiving signals from the optical fiber transmission line in question performs the following switching processing.

Namely, substituting for signals received from working SOH 20a, working SELH 30a selects signals received from protection SOH 20b, and sends them to working SELL 40a. Protection SELH 30b performs the same operation. As described above, the same signals are received from the working optical fiber transmission line 100a and from the protection optical fiber transmission line 200a, and the above operation completes switching from the working lines to the protection lines as described above referring to FIG. 13B.

Next, there will be described upgrading of such an LTE in a 1:1 configuration to ADM of 2-Fiber BLSR or ADM of 2-Fiber UPSR.

Figure 3A:
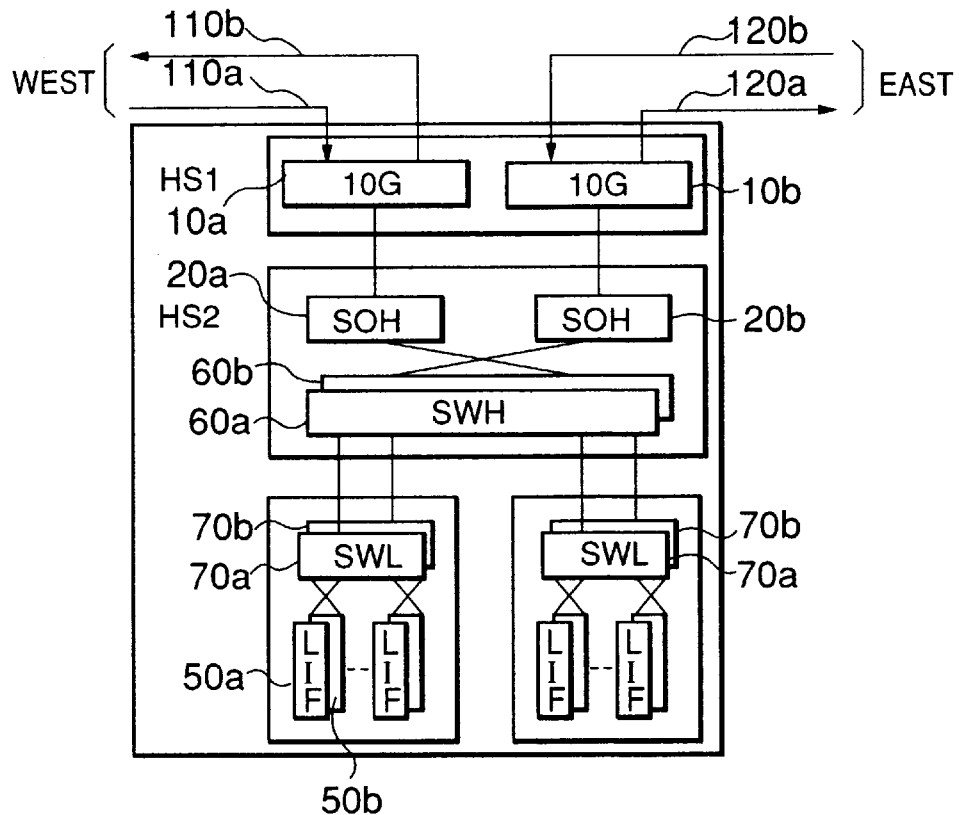
FIG. 3A is a block diagram showing construction of ADM applied for 2-Fiber UPSR/BLSR.

Here, ADM of 2-Fiber BLSR and ADM of 2-Fiber UPSR can be realized with the same construction. FIG. 3A shows the construction of ADM, and FIG. 3B shows a rack into which units are mounted.

Figure 3B:
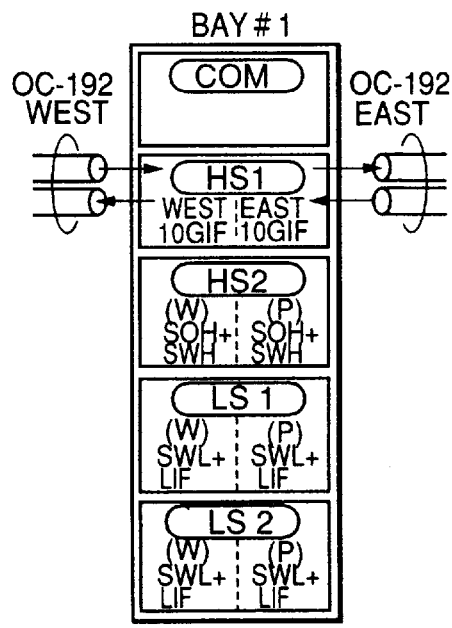
FIG. 3B is a view showing a state in which units of the ADM of FIG. 3A are mounted in a rack.

As will be understood from FIGS. 3A and 3B, upgrading to ADM in this case can be realized by changing the two duplicated SELHs 30a, 30b in the construction of LTE shown in FIG. 2A into duplicated two SWHs 60a, 60b, and by changing two duplicated SELLs 40a, 40b in the construction of LTE into two duplicated SWLs 70a, 70b. Here, SELH and SWH are made to be common in the interface of signal lines with the rack, and, accordingly, they can be exchanged by removing an electronic board constituting SELH from the rack and mounting an electronic board constituting SWH into the rack.

Now, operation of ADM of 2-Fiber UPSR will be described.

It is assumed that an optical fiber transmission line 110a on the West side and an optical fiber transmission line 120a on the East side are working, and an optical fiber transmission line 110b on the West side and an optical fiber transmission line 120b on the East side are protection. At the time of normal operation, signals in respective time slots inputted from the optical fiber transmission line 110a on the West side are inputted through 10 G interface 10a and SOH 20a to SWH 60a, and switched there to SWL 70a and SOH 20b in accordance with destinations of signals of respective time slots, Signals sent to SWL 70a are switched to respective LIFs 50a, Signals from LIFs 50a are inputted through SWL 70a to SWH 60a, and switched there to SOHs 20a, 20b. Further, to SWH 60a, there are inputted signals from the optical fiber transmission line 120b through 10 G interface 10b and SOH 20b, and SWH 60a switches signals in respective time slots to SOH 20b in accordance with their destinations. The signals switched from SWH 60a to SOHs 20a, 20b, are sent to 10 G interfaces 10a, 10b, and to the optical fiber transmission lines 110b, 120a, respectively.

In such a construction, there may arise such a problem that, for example, signals from ADM located on the upstream side of the faulty point with respect to signal flow on a ring formed by working optical fiber transmission lines can not be received from the optical fiber transmission line 110a on the West side. In that case, as for signals from ADM located upstream from the faulty point, SWH 60a of ADM switches signals received from SOH 20b to SWL, instead of signals received from SOH 20a.

When each ADM performs such an operation, the automatic protection switching shown in FIG. 17C can be realized.

Next, there will be described operation of ADM having the construction of FIG. 3A in the case of 2-Fiber BLSR.

To clarify signal flows between transmission lines, description is focused on the relation of operation of SWH 60a with signal flows between transmission lines, without referring to operations of other parts. At the time of normal operation, in ADM, signals inputted from the optical fiber transmission lines 110a, 120b on the receiving side on both West and East sides are inputted to SWH 60a. Among the received signals, signals in the working time slots are switched by SWH 60a to working time slots of the low speed transmission lines or of the optical fiber transmission lines 110b, 120a. Signals inputted from the low speed transmission lines are switched by SWH 60a to the working time slots of the optical fiber transmission lines 110b, 120a. Further, signals in protection time slots inputted from the optical fiber transmission lines on the receiving side on both West and East sides are transited (forwarded) by SWH 60a to protection time slots of the optical fiber transmission lines 110b, 120a, 120b, 110a on the other side.

On the other hand, at the time of automatic protection switching, in two ADMs adjacent to a faulty working optical fiber transmission line, SWH 60a stops transiting (forwarding) signals between the protection time slots, and switches signals which have been switched to working time slots of the faulty working optical fiber transmission line, to protection time slots of an optical fiber transmission line transmitting signals from the ADM in question in the opposite direction to the troubled working optical fiber transmission line. Further, instead of the signals received from the working time slots of the faulty working optical fiber transmission line, signals received from protection time slots of an optical fiber transmission line transmitting signals to the ADM in question in the opposite direction to the faulty working optical fiber transmission line, become objects of switching to the low speed transmission lines and the working time slots of the optical fiber transmission line transmitting signals from the ADM in question in the opposite direction to the faulty working optical transmission line.

The above-described operation realizes the switching operation at the tie of the automatic protection switching shown in FIG. 17B.

Next, there will be described upgrading of LTE in 1:1 configuration shown in FIG. 2A to LTE in 1:n configuration.

FIG. 4A shows construction of LTE in 1:n configuration, and FIG. 4B shows racks into which unit are mounted.

As shown in the figures, in this case, LTE comprises one rack for protection processing, connected with protection optical fiber transmission lines 200a and 200b, and n racks for working processing, connected with working optical fiber transmission lines 100a, 100b, 110a, 110b, . . . , 1n0a, 1n0b respectively.

Each rack constitutes a bay as a functional unit of LTE in 1:n configuration. Each of n bays for working processing 310, 320, . . . has such a construction that, in LTE in 1:1 configuration shown in FIG. 1, the protection 10 G interface 10b has been removed, and PINF 80 has been substituted for the protection SOH 20b. The bay 300 for protection processing has such a construction that, in the rack for working processing, two duplicated SELH have been replaced by two duplicated SELH(P) 90.

Here, an electronic board constituting each SOH 20 and an electronic board constituting each PIN 80 are common in their signal interface with a rack, and thus, an electronic board constituting SOH 20 and an electronic board constituting PINF 80 can be exchanged by removing the former from the rack and mounting the latter into the rack. Further, an electronic board constituting each SELH 30 and an electronic board constituting each SELH(P) 90 are common in their signal interface with a rack, and thus, an electronic board constituting SELH 30 and an electronic board constituting SELH(P) 90 can be exchanged by removing the former from the rack and mounting the latter into the rack. In the present embodiment, LTE in 1:1 configuration can be upgraded to LET in 1:n configuration, by upgrading the LTE in 1:1 configuration to one of bays for working processing, and newly introducing the other bays constituting LTE in 1:n configuration.

At the time of normal operation, each bay for working processing in LTE of FIG. 4A operates similarly to the above described operation of LTE in 1:1 configuration, each performing multiplex conversion between working optical fiber transmission lines connected thereto and low speed transmission lines connected thereto. However, in LTE in 1:n configuration, at the time of normal operation, signal re not sent to the protection optical transmission lines 200a, 200b.

Next, there will be described such a case that, where a problem has arisen, for example, in an optical transmission line 110a connected to a working bay 320 on the receiving side. In this case, SELH(P) 90 of the bay 300 for protection processing sends signals received from a protection optical fiber transmission line 200b through 10 G interface 10 and SOH 20 to PINF 80. Those signals are converted to low speed signals, for example, each having a rate of 150M, and thereafter are sent, through optical interconnect connecting racks, to PINF 80 of a bay 310. PINF 80 of the bay 310 transits the signals received from the bay 300 to PINF 80 of the bay 320. PINF 80 of the bay 320 sends the signals received from the bay 310 to SELH 30. SELH 30 of the bay 320 selects the signals received from PINF 80 instead of the signals from SOH 20, and sends the selected signals to SELL 40.

Conversely, when a problem arises in an optical fiber transmission line 120b connected to the working bay 320 on the sending side, SELH 30 of the bay 330 sends signals to PINF 80 instead of SOH 20. On receiving the signals, PINF 80 sends them to PINF 80 of the bay 310. PINF 80 of the bay 310 transits the signals received from the bay 320 to the bay 300. On receiving the signals, PINF 80 of the bay 300 converts them to serial signals, and sends them SELH(P) 90. SELH(P) 90 sends the signals received from PINF 80 to SOH 20. The signals are sent through the protection optical fiber transmission line 200b.

Thus, in this construction, PINF 80 extends the protection optical transmission line to the working bay connected to the faulty working optical fiber transmission line.

The above-described operation is performed by LTEs at both ends of the faulty working optical fiber transmission line, thus realizing the uni-directional switching of FIG. 13B.

Further, the bi-directional switching of FIG. 13C is realized by the same operation as the uni-directional switching in the case of both sending and receiving optical fiber transmission lines being faulty.

Alternatively, the bi-directional switching may be realized by connecting respective PINFs 80 of the bays in a ring shape as shown in FIGS. 5A and 5B.

In this construction, extension by PINFs 80 of a protection optical fiber transmission line on the receiving side to a working bay connected to a faulty working optical transmission line, and extension by PINFs 80 of a protection optical fiber transmission line on the sending side to the working bay connected to the faulty working optical transmission line are realized through different routes. For example, as shown in the figures, extension of a protection optical fiber transmission line 200a on the receiving side to the bay 320 is attained through PINFs 80 of the bays 300, 310, while extension of a protection optical fiber transmission line 200b on the sending side to the bay 320 is attained through PINFs 80 of the bays 320, 330, . . . , 3n0, and 300.

An advantage of employing this ring-shape construction is that the amount of hardware can be kept to a low level because for example, the number of signal lines connecting racks is small.

Next, there will be described upgrading ADM of 2-Fiber BLSR and ADM of 2-Fiber UPSR shown in FIGS. 3A and 3B to ADM of 4-Fiber BLSR.

Figure 6A:
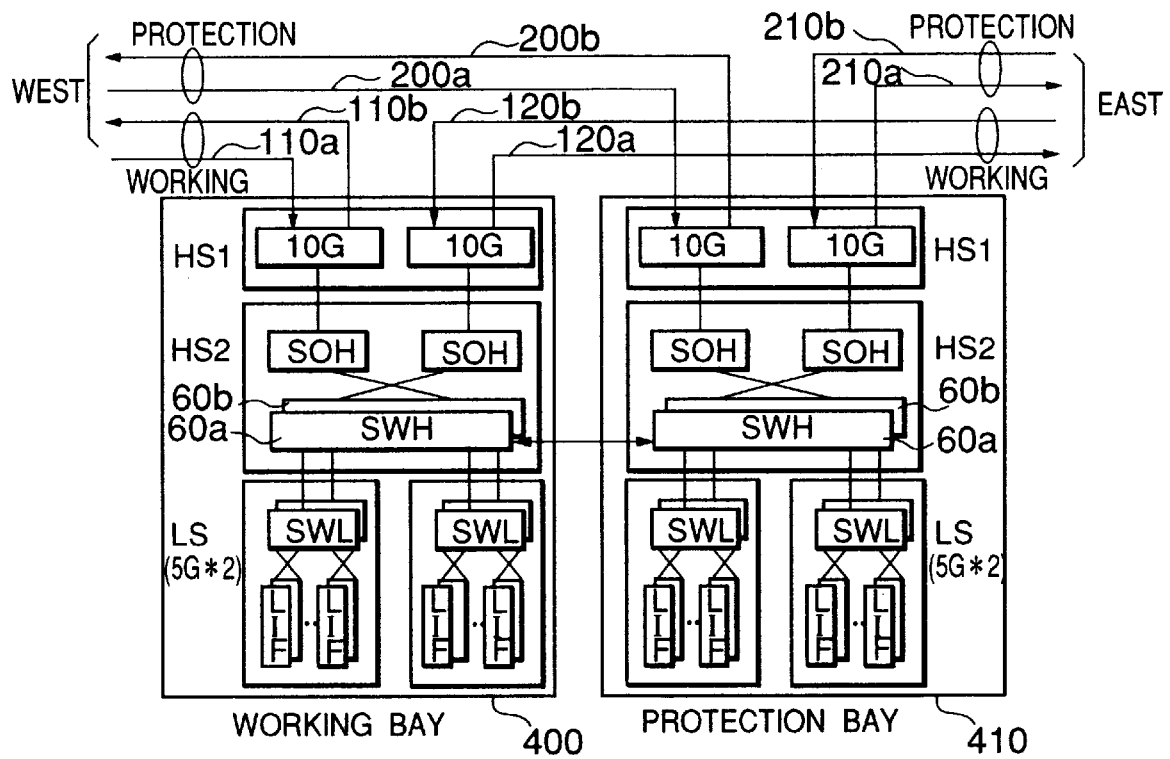
FIG. 6A is a block diagram showing construction of an ADM applied for 4-Fiber BLSR.
Figure 6B:
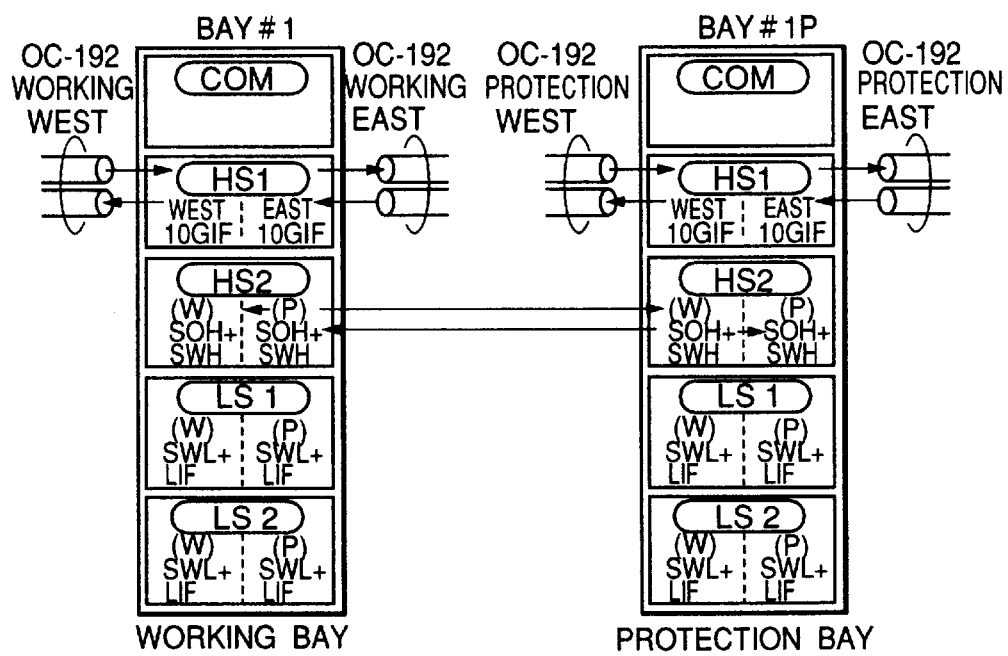
FIG. 6B is a view showing a state in which units of the ADM of FIG. 6A are mounted in racks.

FIG. 6A shows construction of ADM in this case, and FIG. 6B shows racks into which units are mounted.

As shown in the figures, ADM in this case comprises a rack for working processing, connected with working optical fiber transmission lines 110a, 110b, 120a and 120b, and a rack for protection processing, connected with protection optical fiber transmission lines 200a, 200b, 210a and 210b. Bays corresponding to respective racks have the same construction as ADM of 2-Fiber BLSR and ADM of 2-Fiber UPSR shown in FIG. 3A. Accordingly, in this case, upgrading can be performed by letting the existing ADM of 2-Fiber BLSR or 2-Fiber UPSR be one bay of ADM of 4-Fiber BLSR, introducing a new bay having the same construction, and connecting SWHs 60a, 60b of both ADM with optical interconnects. As LTE in 1:1 configuration can be upgraded to ADM of 2-Fiber BLSR or 2-Fiber UPSR, LTE in 1:1 configuration, can of course also be upgrade to ADM 4-Fiber BLSR.

Now, operation of ADM of FIGS. 6A and 6B will be described.

To clarify signal flows between transmission lines, description is focused on the relation of operation of SWH 60a with signal flows between transmission lines, without referring to operations of other parts. At the time of normal operation, in a working bay 400, signals received from optical fiber transmission lines on the receiving side on the West and East sides are inputted into SWH 60a. SWH 60a switches the received signals in respective time slots to low speed transmission lines or to time slots of optical fiber transmission lines on the other side 10b, 120a. Further, signals received from the low speed transmission lines are switched by SWH 60a to time slots of the optical fiber transmission lines 10b, 120a.

Further, SWH 60a of a bay 410 for protection processing forwards signals received from an optical fiber transmission line 200a to an optical fiber transmission line 210a as they are, and forwards signals received from an optical fiber transmission line 210b to an optical fiber transmission line 200b as they are.

At the time of automatic protection switching, when, for example, a problem arises in the working optical fiber transmission lines 120a, 120b on the East side, SWH 60a of the bay 400 for working processing sends signals which has been switched to the working optical fiber transmission line 120a, to SWH 60a of the bay 410 for protection processing. Further, instead of signals which have been received from the working optical transmission line 120b, signals received from the bay 410 for protection processing is made an object of switching. On the other hand, when, SWH 60a of the bay 410 for protection processing stops the forwarding operation between the above-described protection optical fiber transmission lines and performs the switching operation shown in FIG. 16B, it switches the signals received from the bay 400 to the optical fiber transmission line 200b, and sends signals received from the optical fiber transmission line 200a to SWH 60 of the bay 400. Further, when SWH 60a of the bay 410 for protection processing stops the forwarding operation between the above-described protection optical fiber transmission lines and performs the switching operation shown in FIG. 16C, it switches the signals received from the bay 400 to the optical fiber transmission line 210a and sends signals received from the optical fiber transmission line 210b to SWH 60 of the bay 400.

Figure 16A:
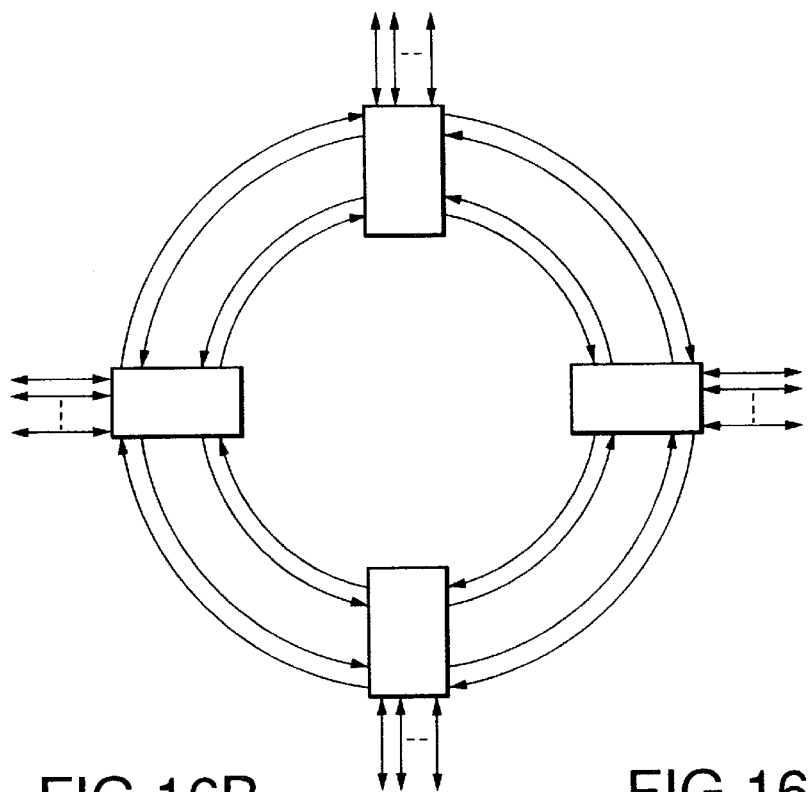
FIG. 16A is a view showing basic construction of a 4-Fiber BLSR transmission system.
Figure 16B:
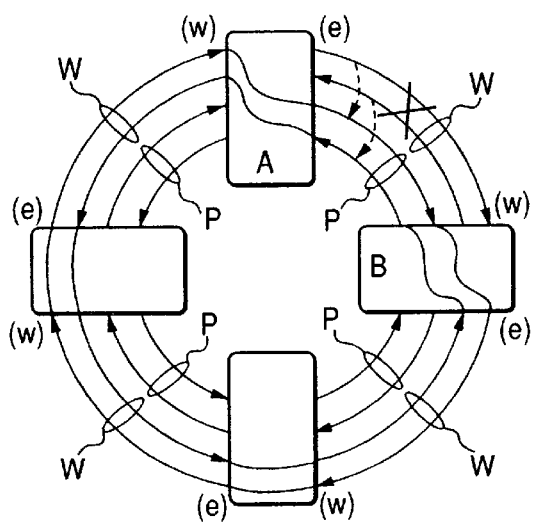
FIG. 16B is a view illustrating switching from working high speed transmission lines to protection high speed transmission lines in 4-Fiber BLSR.
Figure 16C:
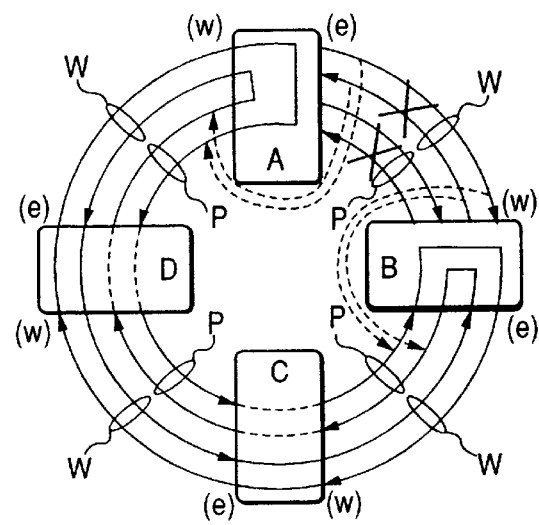
FIG. 16C is a view illustrating another example of switching from working high speed transmission lines to protection high speed transmission lines in 4-Fiber BLSR.

The above described operation is performed by ADMs adjacent to the troubled portion, realizing the automatic protection switching shown in FIGS. 16B, 16C.

Next, there will be described upgrading of ADM of 2-Fiber BLSR or ADM of 2-Fiber UPSR shown in FIG. 3A to ADM in 1:1 linear configuration.

Figure 7:
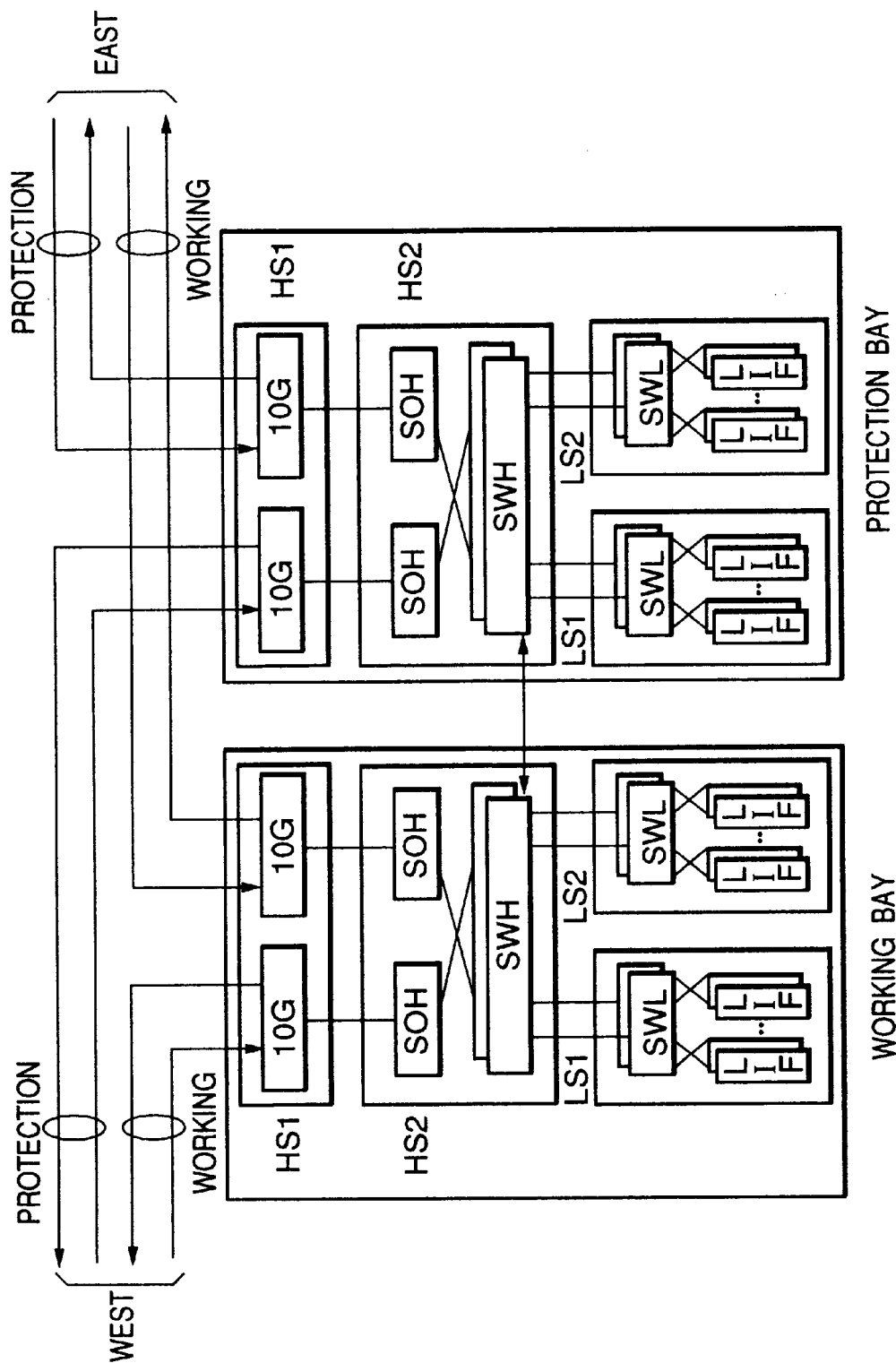
FIG. 7 is a block diagram showing construction of an ADM in 1:1 linear configuration.

FIG. 7 shows construction of ADM in this case.

As shown in the figure, ADM in this case has the same construction as ADM of 4-Fiber BLSR shown in FIG. 6A.

Accordingly, upgrading can be performed by exchanging similar units. Further, as described above, the present construction can also be obtained by upgrading LTE in 1:1 configuration.

Figure 15A:
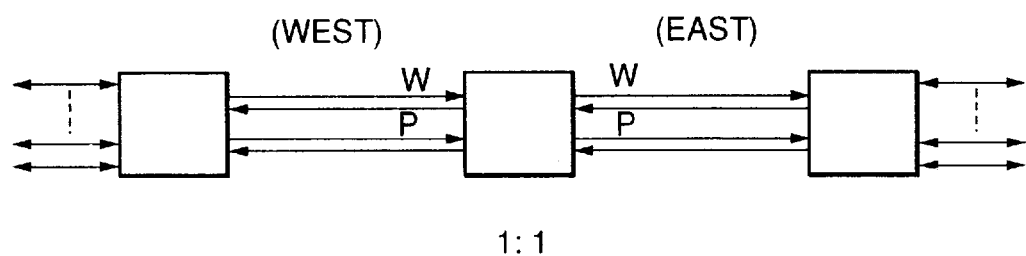
FIG. 15A is a view illustrating switching from working high speed transmission lines to protection high speed transmission lines by LTEs in 1:1 configuration.
Figure 15B:
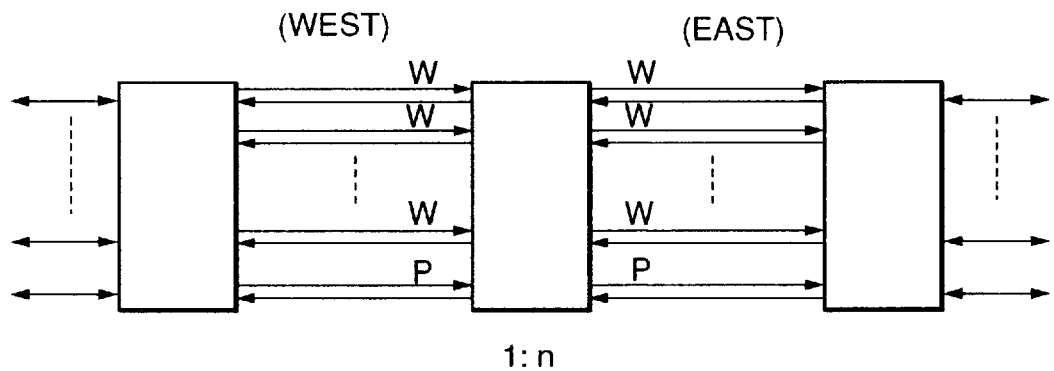
FIG. 15B is a view illustrating switching from working high speed transmission lines to protection high speed transmission lines by LTEs in 1:n configuration.

Further, its operation at the time of normal operation is the same as 4-Fiber BLSR. Its operation at the time of the automatic protection switching as shown in FIG. 15B is same as the case of the switching operation shown in FIG. 16B.

Last, there will be described upgrading to ADM in 1:n linear configuration.

Figure 8:
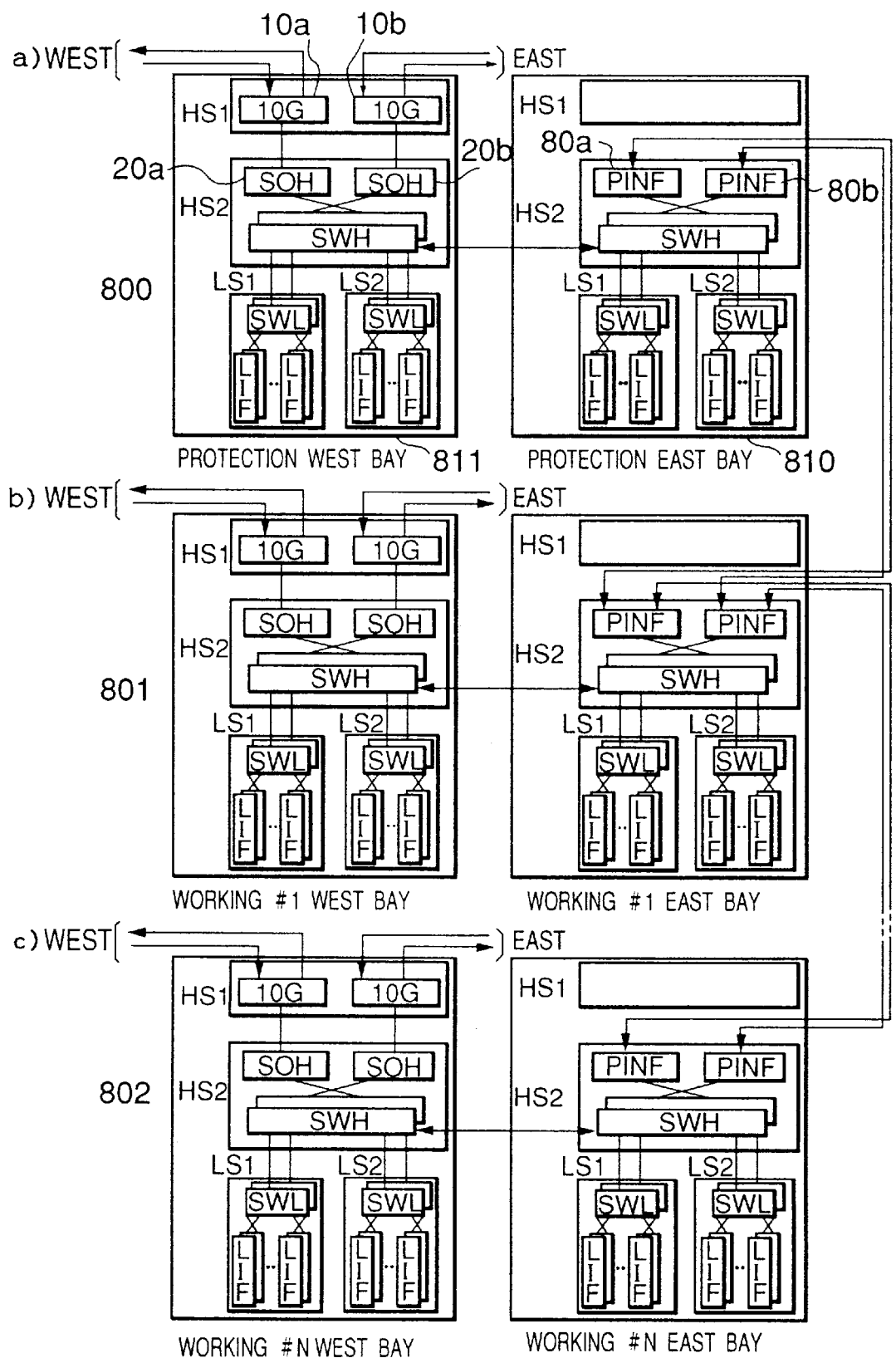
FIG. 8 is a block diagram showing construction of an ADM in 1:n linear configuration.

FIG. 8 shows construction of ADM in this case.

As shown, in this case, ADM has such a construction that there are provided (1+n) sets of bays 800–80n, one set as a protection bay set and n sets as working bay sets, with each set comprising East bay 810 and West bay 811. East bay 810 is obtained, in one of the racks constituting ADM in 1:1 linear configuration shown in FIG. 7, by removing two 10 G interfaces 10a, 10b, and replacing two SOHs 20a, 20b with two PINFs 80a, 80. West bay 811 is the remaining rack of FIG. 7, and PINFs 80a, 80b of respective bay sets are successively connected in a chain so that protection bay set 800 is located at the end.

Accordingly, one of plural bay sets of ADM can be constructed by using ADM in 1:1 linear configuration. Further, as can be seen from FIG. 8, each East bay has such a construction that 10 G interface of each bay of LTE in 1:n configuration is removed, SELH is replaced with SWH, SOH with PINF, and SELL with SWL, and introduced PINFs are connected successively. Accordingly, ADM in 1:n linear configuration can be obtained by upgrading LTE in 1:n configuration.

The protection bay set 800 is connected with one sending and one receiving protection optical fiber transmission lines for each of the East and West sides. Each of n working bay sets 801–80n is connected with one sending and one receiving working optical fiber transmission lines for each of the East and West sides.

At the time of normal operation, the West bay of each working bay set 801–80n operates similarly to the above-described operation of the working bay of ADM in 1:1 linear configuration, realizing transmission between ADMs or between ADM and LTE using n working transmission lines.

On the other hand, at the time of automatic protection switching, when, or example, a problem arises in the optical fiber transmission line on the West side of the second working bay set, as in the above-described case of LTE in 1:n configuration, protection optical fiber transmission line on the West side is extended to SWH of the West bay of second working bay set, by transmitting signals through 10 G interface, SOH and SWH of the West bay of the protection bay set; SWH and PINF of the East bay of the protection bay set; PINF of the East bay of the first working bay set; working PINF and SWH of the East bay of the second working bay set; and SWH of the West bay of the second working bay set, in this order. That extended protection optical fiber transmission line is used by SWH of the West bay of the second working bay set, instead of the faulty optical fiber transmission line on the West side.

Such an operation is performed by ADMs located on both ends of the faulty optical fiber transmission line, realizing switching from the working optical fiber transmission line to the protection optical fiber transmission line.

Alternatively, bay sets of FIG. 8 may be connected in a ring shape as in the LTE in 1:n configuration shown in FIG. 5A, and extension of the protection optical fiber transmission line may be realized in such a manner that signals are forwarded only in one rotational direction on the ring. For example, when a problem aries in the optical fiber transmission line on the West side of second working bay set, similarly to the above-described case of LTE in 1:n configuration, the receiving protection optical fiber transmission line on the West side is extended to SWH of West bay of the second working bay set, by forwarding signals through 10 G interface, SOH and SWH of the West bay of the protection bay set; SWH and PINF of the East bay of the protection bay set; PINF of the East bay of the first working bay set; working PINF and SWH of the East bay of second working bay set; and SWH of the West bay of second working bay set, in this order. Further, the sending protection optical fiber transmission line on the West side is extended to working SWH of the West bay of the second working bay set, by transiting signals through working SWH of the West bay of the second working bay set; working SWH and PINF of the East bay of the second working bay set; working PINF of the East bay of the third working bay set; . . . ; working PINF of the East bay of the n-th working bay set; PINF and SWH of the East bay of the protection bay set; and SWH, SOH and 10 G interface of the West bay of the protection bay set, in this order.

As described above, according to the present invention, it is possible to upgrade a terminal multiplexer, utilizing the constructions of the existing terminal multiplexers. Further, as has been described, each construction of the units of LTE in 1:1 configuration and ADM of 2-Fiber BLSR/2-Fiber UPSR is a duplicated one. Accordingly, at the time of upgrading, necessary units may be exchanged in one of the twin systems at once, and the other system may be used during the exchange, so that the transmission system may be operated continuously.

However, if a difference in delay times exists between input and output signals for SELH, SELH(P) and SWH due to processing in SELH, SELH(P) and SWH, problems may be caused such as loss and duplication of signals at the time of switching of the system in operation.

Accordingly, in the present embodiment, SELH is constructed as shown in FIG. 9A, and SELH(P) as shown in FIG. 9B so that delay times are made to coincide in these units.

Figure 10:
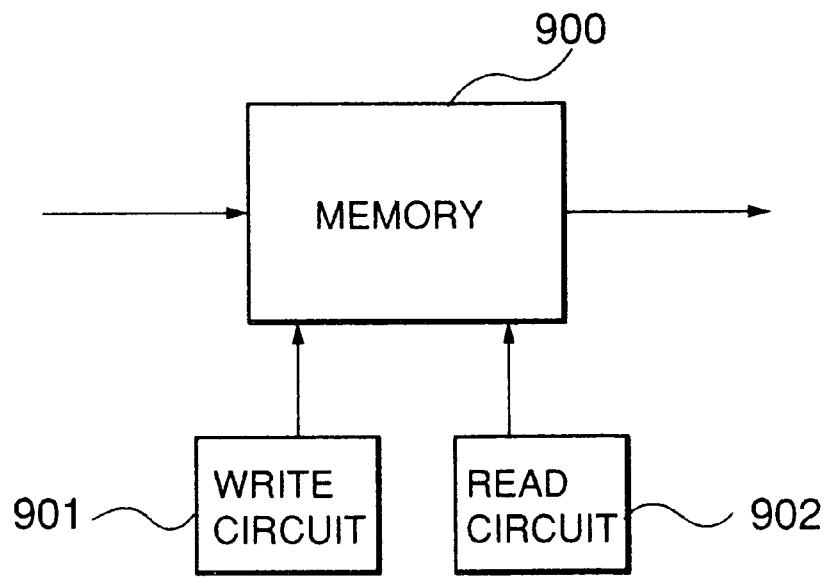
FIG. 10 is a schematic view showing construction of a circuit which performs switching of time slots using memory.

Here, switching of signals in time slots as in SWH is performed, as shown in FIG. 10, by means of memory 900, write circuit 901 which sequentially writes signals in each time slot coming in and out, and read circuit 902 which reads signals in each time slot from the memory in order set by a controller (not shown). Accordingly, a delay time is usually produced which is larger than the time corresponding to the number of time slots. This delay time is generally larger than a delay time in a selector which performs a selection operation, such as SELH and SELH(P).

Figure 11:
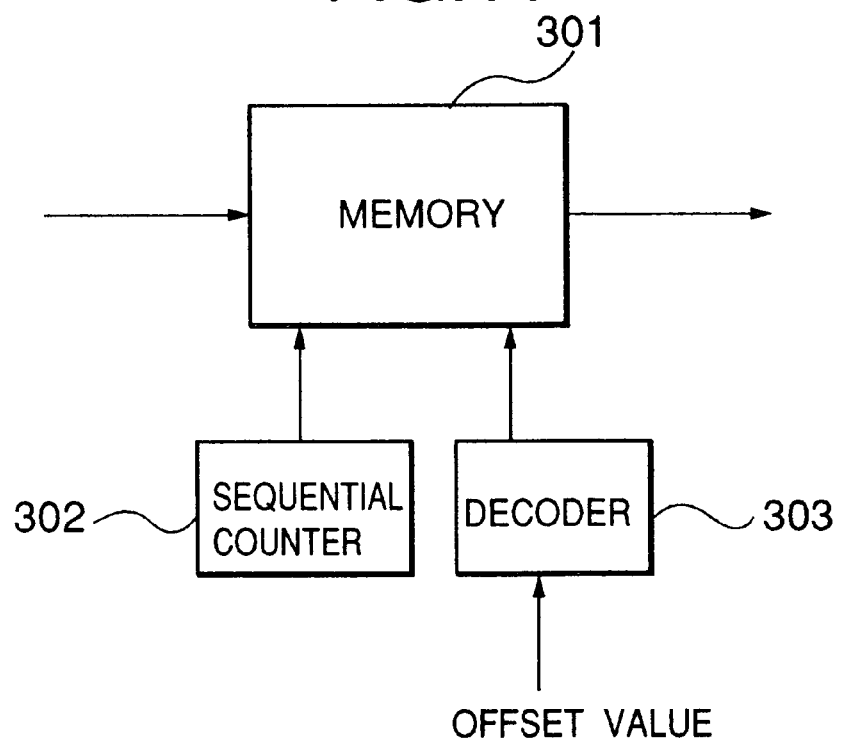
FIG. 11 is a schematic view showing construction of a delay circuit.

In the present invention, delay circuit 1300 is provided for SELH and SELH(P) for adjusting the delay time of signals. As shown in FIG. 11, the delay circuit 1300 comprises a sequential counter 302 which sequentially generates addresses in memory 301 for writing signals in each time slot coming in and out, and a decoder 303 which obtains read address by adding a count value of the sequential counter 302 and an offset corresponding to an adjust time desired. According to such an delay circuit 1300, time elapsing between writing and reading signals to and from the memory 302 can be adjusted by suitably setting the offset value added by the decoder 303.

In FIG. 9A, the reference numeral 320 denotes a selector which selects signals sent from working SOH or signals sent from protection SOH or PINF, and sends the selected signal to SELL.

Further, in FIG. 9B, the reference numeral 320 shows a selector for sending signals sent from PINF to a protection optical fiber transmission line.

Figure 12:
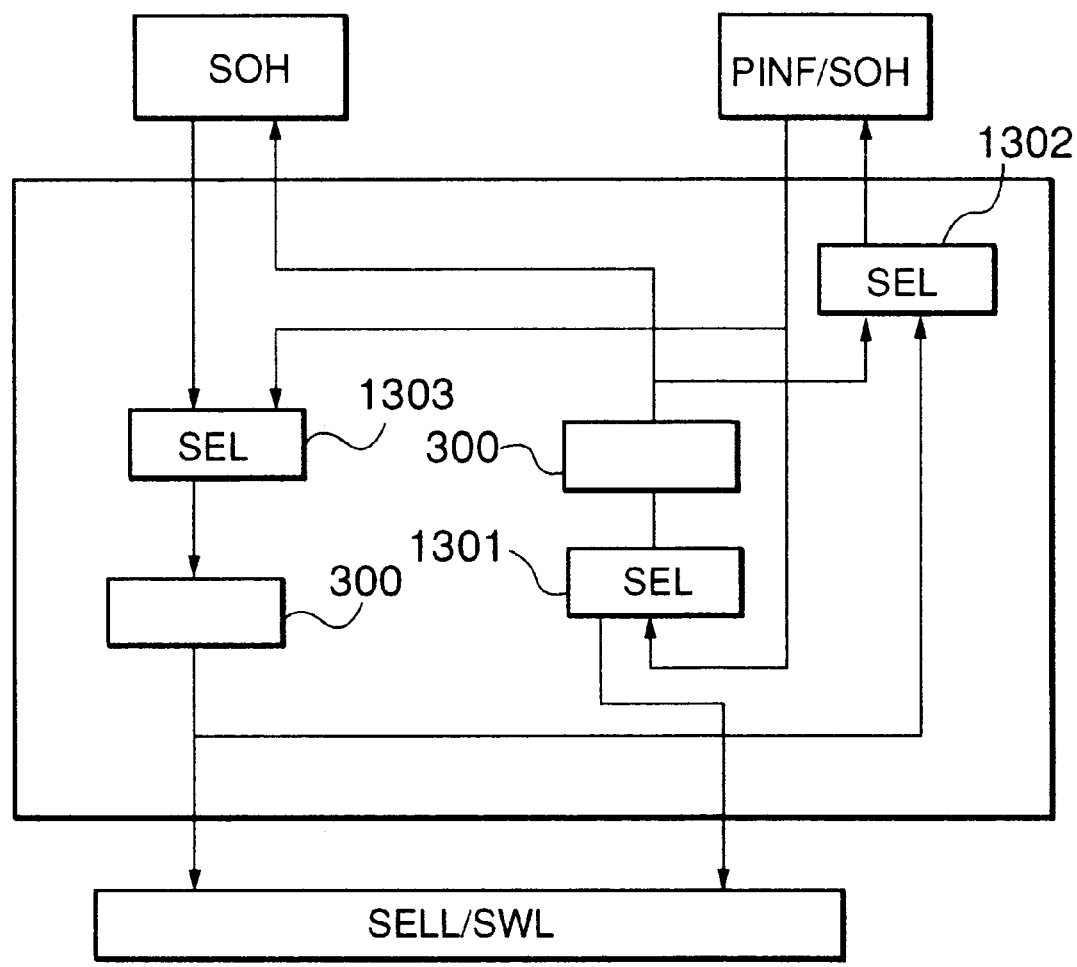
FIG. 12 is a block diagram showing a unit which can be used commonly as an SELH unit and an SELH(P) unit.
Figure 14A:
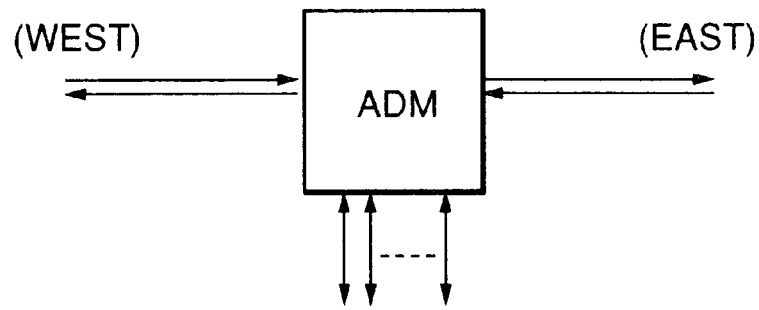
FIG. 14A is a view showing construction of a transmission system using an ADM.
Figure 14B:
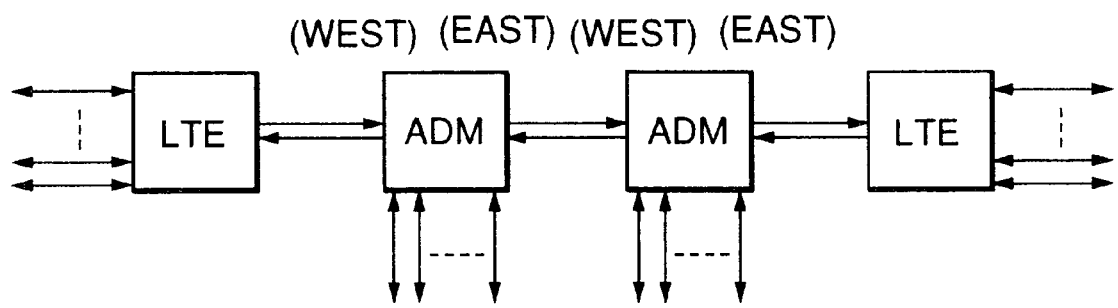
FIG. 14B is a view showing construction of a transmission system in which a plurality of ADMs are connected linearly.
Figure 14C:
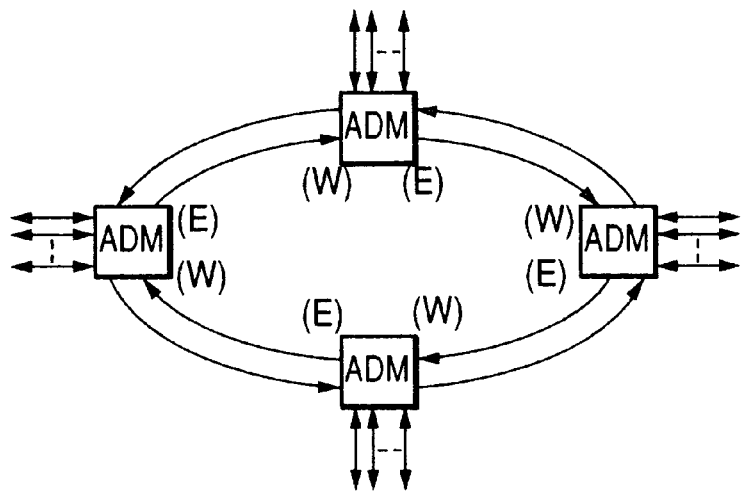
FIG. 14C is a view showing construction of a transmission system in which a plurality of ADMs are connected in a ring shape.

As SELH and SELH(P) shown in FIGS. 9A and 9B, a unit provided with three selector 1301, 1302, 1303, as shown in FIG. 12, may be used in common. In this case, when it is used as SELH(P), selections in the selectors 1301, 1302 are fixed to form the same signal flow as in FIG. 9B, and when used as SELH, selections in the selector 1302, 1303 are fixed to form the same signal flow as in FIG. 9A.

Further, as a construction of an interface frame of an optical fiber transmission line related to the present embodiment, there may be used SONET (Synchronous Optical Network) OC-N frame construction having a transmission rate of 51.84 Mb/s or a multiple thereof, or STM-N frame construction in SDH hierarchy regulated in ITU Recommendation having a transmission rate of 155.52 Mb/s or a multiple thereof As described above, according to the present embodiment, a terminal multiplexer can be upgraded using the existing terminal multiplexer, and construction of a transmission system can be changed by that upgrading.

Further, as in the above-described case of LTE in 1:n configuration, a terminal multiplexer can be constituted by a plurality of racks, and, when working and protection systems are switched, the capacity of signals which are required to be sent and received between racks can be made to be lower in level. Thus, the present construction is suitable for constructing a terminal multiplexer using a plurality of racks.

We claim:

1. A method of constructing a terminal multiplexer, comprising steps of:
   providing
      a high speed transmission line interface unit responsible for signal input-output interface with a set of sending and receiving high speed transmission lines;
      a low speed transmission line interface unit responsible for signal input-output interface with a set of sending and receiving low speed transmission lines;
      a multiplex converting unit for performing multiplexing and demultiplexing between high speed signals transmitted on the high speed transmission lines and low speed signals transmitted on the low speed transmission lines, said multiplex converting unit being duplicated in the form of a working equipment and a protection equipment; and
      a switching unit for switching between the high speed signals transmitted on the high speed transmission lines and the low speed signals transmitted on the low speed transmission lines, said switching unit having an interface for signals from outside of the unit, which is made common with an interface for signals from outside of said multiplex converting unit;
   combining high speed transmission line interface unit, said duplicated multiplex converting unit, and said low speed transmission interface unit to construct a terminal multiplexer; and
   constructing a channel rearrange equipment by substituting said switching unit for said multiplex converting unit of said terminal multiplexer, by the steps of:
      exchanging an electronic circuit board adapted for the protection equipment, which is not currently in operation, of said multiplex converting unit with an electronic circuit board adapted for said switching unit;
      switching the operation of said multiplex converting unit from the working equipment to the protection equipment;
      exchanging an electronic circuit board adapted for the working equipment, which is not currently in operation, of said multiplex converting unit with electronic circuit board adapted for said switching unit; and
      switching back the operation of said multiplex converting unit from the protection equipment to the working equipment.

2. The method of claim 1 for constructing a terminal multiplexer, wherein:
   said multiplex converting unit is provided with delay means for making a delay time between input and output signals in said multiplex converting unit coincide with a delay time between input and output signals in said switching unit.

3. A method of constructing a terminal multiplexer, comprising steps of:
   providing
      a high speed transmission line interface unit responsible for signal input-output interface with a set of sending and receiving high speed transmission lines, said high speed transmission line interface unit being duplicated in the form of a working equipment and a protection equipment;
      a low speed transmission line interface unit responsible for signal input-output interface with a set of sending and receiving low speed transmission lines;
      a multiplex converting unit for performing multiplexing and demultiplexing between high speed signals transmitted on the high speed transmission lines and low speed signals transmitted on the low speed transmission lines, and for performing selection of high speed signals as objects of multiplexing and demultiplexing, said multiplex converting unit being duplicated in the form of a working equipment and a protection equipment; and
      a forwarding unit for forwarding the high speed signals as objects of multiplexing and demultiplexing of said multiplex converting unit, said forwarding unit having an interface for signals with said multiplex converting unit, which is made common with an interface for signals between said high speed transmission line interface unit and said multiplex converting unit;
   combining two said high speed transmission line interface units, said multiplex converting unit, a plurality of said low speed transmission line interface units to construct a terminal multiplexer which performs transmission using two sets of high speed transmission lines;
   replacing an electronic circuit board in one of said duplicated high speed transmission line interface with an electronic circuit board adapted for said forwarding unit to thereby obtain first elementary equipment;
   introducing a plurality of second elementary equipments, each of which is constructed by combining one said high speed transmission line interface unit, said forwarding unit, said multiplex converting unit, and a plurality of low speed transmission line interface units; and forming a terminal multiplexer which performs transmission using two or more sets of high speed transmission lines, by connecting said first elementary equipment and a plurality of said second elementary equipments in such a manner that said forwarding units of said first elementary equipment and of said plurality of second elementary equipments are connected with one another successively.

4. A terminal multiplexer for transmitting signals to an apparatus at each side to be connected to the terminal multiplexer, using n sets of working high speed transmission lines where n is an integer, and one set of sending and receiving protection high speed transmission lines, said terminal multiplexer comprising:

n working equipments and one protection equipment; wherein each of said working equipments comprises:

a high speed transmission line interface unit responsible for signal input-output interface with a set of working high speed transmission lines;

a plurality of low speed transmission line interface units responsible for signal input-output interface with a set of sending and receiving low speed transmission lines;

a multiplex converting unit which performs demultiplexing of high speed signals received by the high speed transmission line interface unit from the working high speed transmission lines, to distribute the demultiplexed signals to respective said low speed transmission line interface units as signals to be sent to the low speed transmission lines, and performs multiplexing of low speed signals received by the respective low speed transmission line interface units from the low speed transmission lines, to send the multiplexed signals to said high speed transmission line interface unit as high speed signals to be sent to the working high speed transmission lines; and a first forwarding unit connected to said multiplex converting unit;

wherein said protection equipment comprises:

a high speed transmission line interface unit responsible for signal input-output interface with a set of protection high speed transmission lines; and a second forwarding unit connected to the high speed transmission line interface unit;

wherein the second forwarding unit of said protection equipment is connected to the first forwarding unit of the first working equipment;

the first forwarding unit of the m-th (m is an integer varying from 1 to (n−1)) working equipment is connected to the first forwarding unit of the (m+1)-th working equipment; and the first forwarding unit of each working equipment and the second forwarding unit of said protection equipment form a transmission system which forwards high speed signals received by the high speed transmission line interface unit of said protection high speed transmission lines from said protection high speed transmission lines to a multiplex converting unit of any working equipment successively, as high speed signals to be objects of demultiplexing in the multiplex converting unit in question instead of high speed signals received by the high speed transmission line interface unit, and forwards high speed signals multiplexed by the multiplex converting unit of any working equipment to the high speed transmission line interface unit of said protection equipment as high speed signals to be sent from said protection high speed transmission lines.

5. A terminal multiplexer for transmitting signals to an apparatus at each side to be connected to the terminal multiplexer, using n sets of working high speed transmission lines where n is an integer, and one set of sending and receiving protection high speed transmission lines, said terminal multiplexer comprising:

n working equipments and one protection equipment; wherein each of said working equipments comprises:

a high speed transmission line interface unit responsible for signal input-output interface with a set of working high speed transmission lines;

a plurality of low speed transmission line interface units responsible for signal input-output interface with a set of sending and receiving low speed transmission lines;

a multiplex converting unit which performs demultiplexing of high speed signals received by the high speed transmission line interface unit from the working high speed transmission lines, to distribute the demultiplexed signals to respective said low speed transmission line interface units as signals to be sent to the low speed transmission lines, and performs multiplexing of low speed signals received by the respective low speed transmission line interface units from the low speed transmission lines, to send the multiplexed signals to said high speed transmission line interface unit as high speed signals to be sent to the working high speed transmission lines; and a first forwarding unit connected to said multiplex converting unit; wherein said protection equipment comprises:

a high speed transmission line interface unit responsible for signal input-output interface with a set of protection high speed transmission lines; and a second forwarding unit connected to the high speed transmission line interface unit;

wherein the second forwarding unit of said protection equipment and the first forwarding units of said working equipments are connected successively in ring shape;

said first forwarding units of said working equipments and the second forwarding unit of said protection equipment, connected in ring shape, form a transmission system transmitting signals in one rotational direction with respect to said ring; and said transmission system forwards high speed signals received by the high speed transmission line interface unit of said protection high speed transmission lines from said protection high speed transmission lines to a multiplex converting unit of any working equipment, as high speed signals to be objects of demultiplexing in the multiplex converting unit in question instead of high speed signals received by the high speed transmission line interface unit, and forwards high speed signals multiplexed by the multiplex converting unit of any working equipment to the high speed transmission line interface unit of said protection equipment as high speed signals to be sent from said protection high speed transmission lines.

6. A terminal multiplexer for transmitting signals to an apparatus at each side to be connected to the terminal multiplexer, using n sets of working high speed transmission lines where n is an integer, and one set of sending and receiving protection high speed transmission lines, for each of an East side as a first connecting side and a West side as a second connecting side, said terminal multiplexer comprising:

n working equipments and one protection equipment; wherein each of said working equipments comprises:

a high speed transmission line interface unit responsible for signal input-output interface with a set of working high speed transmission lines for each of the East and West sides;

a plurality of low speed transmission line interface units responsible for signal input-output interface with a set of sending and receiving low speed transmission lines;

a switching unit which performs switching of signals between the working high speed transmission lines on opposite sides with respect to East and West sides, with two sending and receiving working high speed transmission lines on each side, and between working high speed transmission lines and said low speed transmission lines; and a first forwarding unit connected to said switching unit;

wherein said protection equipment comprises:

a high speed transmission line interface unit responsible for signal input-output interface with high speed transmission lines on East and West sides, with a set of sending and receiving high speed transmission lines on each side; and a second forwarding unit connected to the high speed transmission line interface unit;

wherein the second forwarding unit of said protection equipment is connected to the first forwarding unit of the first working equipment;

the first forwarding unit of the m-th (m is an integer varying from 1 to (n−1)) working equipment is connected to the first forwarding unit of the (m+1)-th working equipment; and first forwarding units of said working equipments and the second forwarding unit of said protection equipment form a transmission system which forwards high speed signals received by the high speed transmission line interface unit of said protection high speed transmission lines from said protection high speed transmission lines to a switching unit of any working equipment successively, as high speed signals to be objects of switching in the switching unit in question instead of high speed signals received by the high speed transmission line interface unit, and forwards high speed signals which have been switched by the switching unit of any working equipment to the high speed transmission line interface unit, to the high speed transmission line interface unit of said protection equipment.

7. A terminal multiplexer for transmitting signals to an apparatus at each side to be connected to the terminal multiplexer, using n sets of working high speed transmission lines where n is an integer, and one set of sending and receiving protection high speed transmission lines, for each of an East side as a first connecting side and a West side as a second connecting side, said terminal multiplexer comprising:

n working equipments and one protection equipment; wherein each of said working equipments comprises:

a high speed transmission line interface unit responsible for signal input-output interface with a set of working high speed transmission lines for each of the East and West sides;

a plurality of low speed transmission line interface units responsible for signal input-output interface with a set of sending and receiving low speed transmission lines;

a switching unit which performs switching of signals between the working high speed transmission lines on opposite sides with respect to East and West sides, with the sending and receiving working high speed transmission lines on each side, and between the working high speed transmission lines and said low speed transmission lines;

a first forwarding unit connected to said switching unit; said protection equipment comprises at least:

a high speed transmission line interface unit responsible for signal input-output interface with high speed transmission lines on East and West sides, with a set of sending and receiving high speed transmission lines on each side; and wherein the second forwarding unit of said protection equipment and the first forwarding units of said working equipments are connected successively in a ring shape;

said second forwarding unit and said first forwarding units of said working equipments, connected in a ring shape, form a transmission system transmitting signals in one rotational direction with respect to said ring; and said transmission system forwards high speed signals received by the high speed transmission line interface unit of said protection high speed transmission lines from said protection high speed transmission lines to a switching unit of any working equipment successively, as high speed signals to be objects of switching in the switching unit in question instead of high speed signals received by the high speed transmission line interface unit, and forwards high speed signals which have been switched by the switching unit of any working equipment to the high speed transmission line interface unit, to the high speed transmission line interface unit of said protection equipment.

8. The method of claim 3 for constructing a terminal multiplexer, wherein:

said forwarding units are connected with one another by means of an optical transmission medium.

9. The terminal multiplexer of claim 4, wherein:

an optical transmission medium is used as a connection medium connecting said forwarding units with one another.

10. The method of claim 1 for constructing a terminal multiplexer, wherein:

SONET OC-N frame construction having a transmission rate of 51.84 Mb/s or a multiple thereof is used as an interface frame construction for said high speed transmission lines.

11. The method of claim 1 for constructing a terminal multiplexer, wherein:

there is used, as an interface frame construction for said high speed transmission lines, STM-N frame construction in SDH hierarchy conforming to ITU Recommendations, having a transmission rate of 155.52 Mb/s or a multiple thereof.

12. The method of claim 3, wherein said multiplex converting unit is provided with delay means for adjusting a delay time between input and output signals to compensate for the switching delay between the high speed signals transmitted on the high speed transmission lines and the low speed signals transmitted on the low speed transmission lines.

13. The method of claim 3, wherein said set of sending and receiving high speed transmission lines and said set of sending and receiving low speed transmission lines correspond to optical fiber transmission lines for transmitting signals of a synchronous optical network (SONET) frame construction having a transmission rate of 51.84 Mb/s or a multiple of said 51.84 Mb/s.

14. The method of claim 3, wherein said set of sending and receiving high speed transmission lines and said set of sending and receiving low speed transmission lines correspond to optical fiber transmission lines for transmitting signals of a STM frame construction having a transmission rate of 155.52 Mb/s or a multiple of said 155.52 Mb/s.

15. The terminal multiplexer of claim 5, wherein said multiplex converting unit is provided with delay means for adjusting a delay time between input and output signals to compensate for the switching delay between the high speed signals transmitted on the high speed transmission lines and the low speed signals transmitted on the low speed transmission lines.

16. The terminal multiplexer of claim 5, wherein said set of sending and receiving high speed transmission lines and said set of sending and receiving low speed transmission lines correspond to optical fiber transmission lines for transmitting signals of a synchronous optical network (SONET) frame construction having a transmission rate of 51.84 Mb/s or a multiple of said 51.84 Mb/s.

17. The terminal multiplexer of claim 5, wherein said set of sending and receiving high speed transmission lines and said set of sending and receiving low speed transmission lines correspond to optical fiber transmission lines for transmitting signals of a STM frame construction having a transmission rate of 155.52 Mb/s or a multiple of said 155.52 Mb/s.

18. The terminal multiplexer of claim 6, wherein said multiplex converting unit is provided with delay means for adjusting a delay time between input and output signals to compensate for the switching delay between the high speed signals transmitted on the high speed transmission lines and the low speed signals transmitted on the low speed transmission lines.

19. The terminal multiplexer of claim 6, wherein said set of sending and receiving high speed transmission lines and said set of sending and receiving low speed transmission lines correspond to optical fiber transmission lines for transmitting signals of a synchronous optical network (SONET) frame construction having a transmission rate of 51.84 Mb/s or a multiple of said 51.84 Mb/s.

20. The terminal multiplexer of claim 6, wherein said set of sending and receiving high speed transmission lines and said set of sending and receiving low speed transmission lines correspond to optical fiber transmission lines for transmitting signals of a STM frame construction having a transmission rate of 155.52 Mb/s or a multiple of said 155.52 Mb/s.

* * * * *